(12) United States Patent
Yamada

(10) Patent No.: US 10,105,930 B2
(45) Date of Patent: Oct. 23, 2018

(54) LAMINATED FILM AND FILM ATTACHMENT METHOD

(71) Applicant: Sharp Kabushiki Kaisha, Sakai, Osaka (JP)

(72) Inventor: Nobuaki Yamada, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 141 days.

(21) Appl. No.: 15/115,016

(22) PCT Filed: Feb. 18, 2015

(86) PCT No.: PCT/JP2015/054401
§ 371 (c)(1),
(2) Date: Jul. 28, 2016

(87) PCT Pub. No.: WO2015/125811
PCT Pub. Date: Aug. 27, 2015

(65) Prior Publication Data
US 2017/0217129 A1   Aug. 3, 2017

(30) Foreign Application Priority Data
Feb. 18, 2014 (JP) .................. 2014-028777

(51) Int. Cl.
*B32B 7/12* (2006.01)
*B32B 37/12* (2006.01)
(Continued)

(52) U.S. Cl.
CPC .............. *B32B 7/12* (2013.01); *B32B 7/08* (2013.01); *B32B 27/325* (2013.01); *B32B 27/36* (2013.01);
(Continued)

(58) Field of Classification Search
CPC .. B32B 7/12; B32B 7/08; B32B 37/12; B32B 38/10; B32B 2405/00; B32B 2457/208;
(Continued)

(56) References Cited

U.S. PATENT DOCUMENTS 9,757,934 B2* 9/2017 Wadsworth ......... B29C 63/0004
2002/0104676 A1  8/2002 Treutlein et al.
(Continued)

FOREIGN PATENT DOCUMENTS

CN   201538078 U   8/2010
CN   203435041 U   2/2014
(Continued)

OTHER PUBLICATIONS

Machine translation of CN 201538078, printed Feb. 12, 2018.*

*Primary Examiner* — Patricia L. Nordmeyer
(74) *Attorney, Agent, or Firm* — Harness, Dickey & Pierce, P.L.C.

(57) ABSTRACT

A laminated film can be easily used by general users and can prevent entry of foreign substances and air bubbles between the attached surfaces even when the film is manually attached in a typical room environment in which foreign substances such as dust are floating. A film attachment method using such a laminated film is also disclosed. In an embodiment, the laminated film includes: a first surface protective film; a foreign-substance-removing adhesive layer; a foreign-substance-removing film; an integrating adhesive layer; a second surface protective film; a substrate-attaching adhesive layer; and a functional film, the substrate-attaching adhesive layer exhibiting a higher bond strength with the functional film than with the second surface protective film.

23 Claims, 20 Drawing Sheets

(51) Int. Cl.
  *B32B 38/10* (2006.01)
  *B32B 7/08* (2006.01)
  *B32B 27/32* (2006.01)
  *B32B 27/36* (2006.01)
(52) U.S. Cl.
  CPC .............. *B32B 37/12* (2013.01); *B32B 38/10* (2013.01); *B32B 2307/412* (2013.01); *B32B 2405/00* (2013.01); *B32B 2457/208* (2013.01)
(58) Field of Classification Search
  CPC .......... B32B 2457/20; B32B 2307/402; B32B 2307/40
  See application file for complete search history.

(56) References Cited

U.S. PATENT DOCUMENTS

| | | | |
|---|---|---|---|
| 2004/0130788 A1 | 7/2004 | Minami | |
| 2012/0064338 A1* | 3/2012 | Niimi | ........................ C09J 7/02 428/354 |
| 2012/0087072 A1* | 4/2012 | McGuire | ............. B29C 63/0047 361/679.01 |
| 2013/0040088 A1* | 2/2013 | Hirayama | .......... G02B 27/0006 428/41.7 |
| 2013/0344275 A1 | 12/2013 | Shin et al. | |

FOREIGN PATENT DOCUMENTS

| | | |
|---|---|---|
| GB | 2485522 A | 5/2012 |
| JP | 8-050290 A | 2/1994 |
| JP | 7-318919 A | 8/1995 |
| JP | H8-274058 A | 10/1996 |
| JP | 2002-303707 A | 10/2002 |
| JP | 2003-534954 A | 11/2003 |
| JP | 2006-119186 A | 5/2006 |
| JP | 2006-186026 A | 7/2006 |
| JP | 2007-172241 A | 7/2007 |
| JP | 2009-300506 A | 12/2009 |
| JP | 2010-286664 A | 12/2010 |
| JP | 2012-218353 A | 11/2012 |
| JP | 2014-004834 A | 1/2014 |

\* cited by examiner (a)

(b)

(c)

(d)

(a)

(b)

(a)

(b)

(a)

(b)

(a)

(b)

(a)

(b)

(c)

(a)

(b)

(c)

(d)

LAMINATED FILM AND FILM ATTACHMENT METHOD

TECHNICAL FIELD

The present invention relates to laminated films and film attachment methods. More specifically, the present invention relates to a laminated film suitably attachable to the surface of a mobile display device such as a cellphone or a tablet PC; and a film attachment method allowing users in a non-cleanroom environment such as a home or mass retailer to suitably attach such a laminated film to a product.

BACKGROUND ART

Mobile display devices such as cellphones and tablet PCs are apt to be damaged when hit or scratched, for example, and thus the users often manually attach a protective film to the surface of their mobile display device on their own. When the users attach a film to a product on their own, they usually attach a film in a typical room environment which is not a controlled environment such as a cleanroom environment or vacuum. In a typical room environment, however, it is difficult to manually attach a film while sufficiently preventing entry of foreign substances and air bubbles between the product and the film.

One film attachment method that can be manually performed and can prevent entry of foreign substances and air bubbles even in a typical room environment is a method that controls the attachment position of the film and removes air bubbles using soapy water, and then dries the film in the air. This method is used by a professional of film attachment when he or she attaches to a glass window a film on which a company logo or an advertisement is printed. This method has advantages such as a fine control of the attachment position. However, this method is inconvenient for general users because soapy water is required and air-drying takes time, for example. Also, the method can still be improved in terms of preventing entry of foreign substances, though the method can sufficiently remove air bubbles.

Meanwhile, mainly for the case of attaching a film to a product in a factory, there are various known treatment methods and devices for preventing entry of foreign substances and air bubbles between attached surfaces. The common methods here include, for example, a method of performing attachment in a cleanroom or in vacuum (e.g. Patent Literature 1). For example, for attachment to a liquid crystal panel, a large-scale cleaning system is used.

Patent Literature 2 discloses a method including supplying a liquid whose temperature is higher than the room temperature to eliminate foreign substances and dirt on the surface of the liquid crystal panel. Patent Literature 3 discloses an attachment apparatus configured to automatically clean the surface of the liquid crystal panel body with its foreign-substance-cleaning roller before attachment of a polarizer to the surface.

Other known methods are to remove foreign substances by making the foreign substances stick to an adhesive layer. Patent Literature 4 discloses a foreign-substance-removing adhesive tape whose adhesive layer surface picks up foreign substances on the surface of a product such as a semiconductor wafer and a glass substrate to remove the foreign substances. Patent Literature 5 discloses a foreign-substance-removing sheet designed to be attached to a conveyer member when used, wherein the separator for protection of the surface of the foreign-substance-removing layer is attached to the foreign-substance-removing layer by an adhesive layer.

Also, although it is not designed to prevent foreign substances present in the surrounding air at the time of film attachment from entering between the attached surfaces, Patent Literature 6 discloses a screen protective sheet capable of removing foreign substances sticking to the layer for attachment in the production process by utilizing a removal layer that is obtained by applying and solidifying a liquid resin agent and is to be removed before attachment. This screen protective sheet does not have a function of removing foreign substances on the screen which is considered to be the attachment target.

Similarly, although it is not designed to prevent foreign substances present in the surrounding air at the time of film attachment from entering between the attached surfaces either, Patent Literature 7 discloses a laminated body having a similar structure to the foreign-substance-removing adhesive tape or sheet described in Patent Literature 4 or 5. That is, Patent Literature 7 discloses a long body including a pattern-structure layer, wherein the long object is attached to one surface of a pattern-layer film by an adhesive layer, and a removal film is attached to the other surface of the pattern-layer film by an adhesive layer.

CITATION LIST

Patent Literature

Patent Literature 1: JP H07-318919 A
Patent Literature 2: JP 2010-286664 A
Patent Literature 3: JP H08-50290 A
Patent Literature 4: JP H08-274058 A
Patent Literature 5: JP 2006-186026 A
Patent Literature 6: JP 2006-119186 A
Patent Literature 7: JP 2012-218353 A

SUMMARY OF INVENTION

Technical Problem

As described above, the conventional film attachment methods capable of preventing entry of foreign substances and air bubbles have not been easy to use for general users and have not achieved sufficient effects. For example, in the method that attaches a film using soapy water, the surface to which a film is to be attached and the adhesive surface of the film are both exposed to the typical room environment before the film is attached. This state unfortunately lets foreign substances stick to the surfaces. Hence, the method that attaches a film using soapy water can be improved such that entry of foreign substances is more sufficiently prevented.

Also, the technique of Patent Literature 1 utilizes a vacuum chamber. The technique of Patent Literature 2 utilizes a liquid whose temperature is higher than room temperature. The technique of Patent Literature 3 is designed to be used when the process is automatically performed by an attachment apparatus. Patent Literatures 4 and 5 each merely disclose removal of foreign substances by a foreign-substance-removing adhesive tape or sheet, and do not disclose how to attach a film to a product while preventing entry of foreign substances and air bubbles after removal of the foreign-substance-removing adhesive tape or sheet. Neither of the techniques of Patent Literatures 6 and 7 is designed to prevent entry of foreign substances present in the surrounding air at the time of film attachment.

Hereinafter, before the principle of the present invention is described, description is given for the reason that foreign substances and air bubbles enter between a product and a film when a conventional laminated film not having a function of removing foreign substances is attached to a product in a typical room environment, with reference to FIG. 36.

FIG. 36 includes cross-sectional views illustrating an attachment method for a conventional laminated film. In the following, the procedure of attaching a conventional laminated film is described based on FIG. 36. The view (a) in FIG. 36 illustrates the state of a substrate 100 before a laminated film is attached. In a typical room environment which is not a controlled environment such as a cleanroom environment or vacuum, many fine foreign substances 200 such as dust are floating. Hence, the foreign substances 200 are sticking to the surface of the substrate 100. Even when the surface of the substrate 100 is cleaned before attachment of a laminated film, it is difficult to prevent the foreign substances 200 from sticking again to the surface of the substrate 100 in a typical room environment if the attachment is not performed immediately after completion of the cleaning. The above-described Patent Literature showing the method for removing foreign substances by a foreign-substance-removing adhesive tape or sheet does not disclose any measure to take for such a problem.

The view (b) in FIG. 36 illustrates the positional alignment of a conventional laminated film before attachment. The conventional laminated film illustrated in the view (b) in FIG. 36 has a structure including a separator film 211 arranged on the lower surface of an optical film 217 with an adhesive layer 216 in between.

As illustrated in the view (c) in FIG. 36, the separator film 211 is peeled off to expose the adhesive layer 216. Since the surface of the adhesive layer 216 exhibits weak adhesion, the foreign substances 200 floating in the room environment are likely to stick to the surface.

As illustrated in the view (d) in FIG. 36, the adhesive layer 216 is brought into close contact with the substrate 100 by an attachment roller 241, so that the optical film 217 is attached to the substrate 100. If the foreign substances 200 are sticking to the surface of the substrate 100 or the adhesive layer 216, the attachment causes the foreign substances 200 to be included between the substrate 100 and the optical film 217. Also, air bubbles can be included between the substrate 100 and the optical film 217. In the case where the substrate 100 is a screen of a display device, the portions including air bubbles may appear as white spots and the portions including foreign substances may function as lenses, so that the display device may fail to provide appropriate display. Accordingly, a laminated film attachment method which can prevent entry of foreign substances and air bubbles even in a typical room environment has been desired.

The present invention has been made in view of the above current state of the art, and aims to provide a laminated film that can be easily used by general users and can prevent entry of foreign substances and air bubbles between the attached surfaces even when the film is manually attached in a typical room environment in which foreign substances such as dust are floating; and a film attachment method using such a laminated film.

Solution to Problem

The inventor has made various studies on functional films and film attachment methods that do not require any special environmental control or special equipment for attachment, and that can prevent entry of foreign substances and air bubbles even when attachment is manually performed in a typical room environment. As a result, the inventor has focused on the typical room environment in which many foreign substances such as dust are floating in the air and, even when foreign substances on the substrate, which is the target of functional film attachment, are once removed, foreign substances stick again to the substrate and the adhesive surface of the functional film until immediately before attachment of the functional film. The inventor has then found that a laminated film including a foreign-substance-removing film capable of cleaning up the surface of the substrate can remove foreign substances on the substrate immediately before the functional film is attached, and then immediately attach the functional film. The inventor has also found that foreign substances can be more effectively prevented from sticking to the adhesive surface of the functional film by additionally using a surface protective film capable of protecting the surface of the functional film exposed after peeling of a foreign-substance-removing film from the laminated film. Furthermore, the inventor has found that when the attachment method is devised, foreign substances can be effectively prevented from sticking to the adhesive surface of a functional film. Thereby, the present inventor has solved the problems, completing the present invention.

That is, one aspect of the present invention may be a laminated film including in the following order: a first surface protective film; a foreign-substance-removing adhesive layer; a foreign-substance-removing film; an integrating adhesive layer; a second surface protective film; a substrate-attaching adhesive layer; and a functional film, the substrate-attaching adhesive layer exhibiting a higher bond strength with the functional film than with the second surface protective film.

Another aspect of the present invention may be a laminated film including in the following order: a first surface protective film; a foreign-substance-removing adhesive layer; a foreign-substance-removing film; an integrating adhesive layer; a second surface protective film; a substrate-attaching adhesive layer; and a functional film, the substrate-attaching adhesive layer having higher adhesive power than the foreign-substance-removing adhesive layer and the integrating adhesive layer.

Yet another aspect of the present invention may be a film attachment method for attaching to a substrate a functional film included in the laminated film of the present invention, including the steps of:

(1) peeling off the first surface protective film from the laminated film to expose the foreign-substance-removing adhesive layer;

(2) bringing the exposed foreign-substance-removing adhesive layer into close contact with the surface of the substrate to attach the laminated film to the substrate;

(3) connecting, by a connection component, a vicinity of the region of the substrate with the laminated film attached thereto and an end of the functional film that is on the top of the laminated film;

(4) peeling off the integrating adhesive layer from the foreign-substance-removing film in the state where the substrate and the functional film are kept in contact with each other by the connection component; and (5) peeling off the second surface protective film from the substrate-attaching adhesive layer to expose the substrate-attaching adhesive layer while peeling off the foreign-substance-removing adhesive layer from the surface of the substrate to expose the surface of the substrate and, immediately after the exposure, bringing the exposed substrate-attaching adhesive layer into close contact with the exposed surface of the substrate to attach the functional film to the substrate.

Advantageous Effects of Invention

The laminated film of the present invention can, even when foreign substances such as dust are present on the substrate, remove the foreign substances on the substrate immediately before attachment of a functional film, and then immediately attach the functional film. Accordingly, the laminated film can sufficiently prevent entry of foreign substances and air bubbles in an interface between the attached surfaces. Also, since the laminated film requires no special environmental control or equipment for attachment and requires no liquid, the laminated film can be easily used by general users.

Also, the film attachment method of the present invention utilizing the laminated film of the present invention enables a functional film to be attached to a substrate without entry of foreign substances and air bubbles in an interface between the attached surfaces even in a typical room environment. Furthermore, differently from the conventional attachment method using soapy water, the film attachment method of the present invention is a dry attachment method which requires no liquid. Hence, the film attachment method can greatly shorten the work time, and allows work without contamination of the work environment.

DESCRIPTION OF EMBODIMENTS

Definition of Terms

The term "film" herein is not limited by its thickness, and may be what is called a "sheet".

The adhesive power of an adhesive layer is different for different attachment targets and in the measurement methods. Herein, in the case of evaluating the adhesive power of an adhesive layer, a substrate made of alkali-free glass is used as the attachment target regardless of the actual attachment target, and an adhesive power value determined by the following measurement method is used. However, in the case of evaluating the adhesive power of an adhesive layer for a surface on which an easy-peel treatment has been performed, a substrate made of alkali-free glass on which the same easy-peel treatment has been performed is used. Here, the absolute value of the adhesive power is different for different attachment targets, but the relation of the adhesive power strengths tends not to change.

(Method for Measuring Adhesive Power)

To a substrate horizontally fixed, a strip-like film including an adhesive layer with a width of 25 mm is attached. At this time, one end of the film should not be attached to the substrate. The one end of the film not attached to the substrate is held between clamps of a tensile tester (peel test jig), so that a 90° peel test (rate of pulling: 0.3 m/min) is performed.

Hereinafter, embodiments and examples of the present invention are described with reference to drawings. The present invention, however, is not limited to the following embodiments and examples. Also, the structures in the embodiments and examples may be appropriately combined or changed if the combination or change does not go beyond the spirit of the present invention. In the embodiments, components exerting the same function are provided with the same reference signs.

Embodiment 1

(1) Structure of Laminated Film

Figure 1:
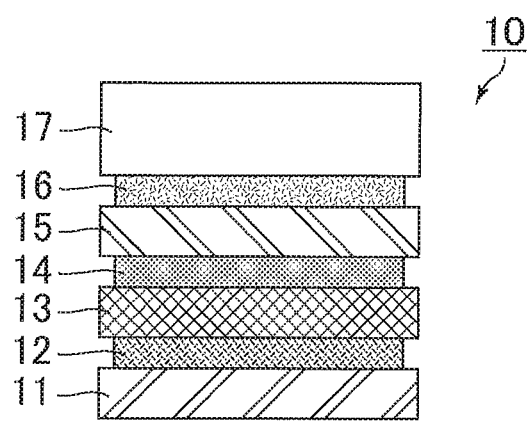
FIG. 1 is a schematic cross-sectional view illustrating a laminated film of Embodiment 1.

FIG. 1 is a schematic cross-sectional view illustrating a laminated film of Embodiment 1. A laminated film 10 of Embodiment 1 has a structure including components in the order of a first separator film (first surface protective film) 11, a foreign-substance-removing adhesive layer 12, a foreign-substance-removing film 13, an integrating adhesive layer 14, a second separator film (second surface protective film) 15, a substrate-attaching adhesive layer 16, and an optical film (functional film) 17. When the laminated film 10 is attached to a substrate, the optical film 17 comes to the top of the laminated film 10. On the surface of the optical film 17 on which the substrate-attaching adhesive layer 16 is not provided, an adhesive layer and a surface protective film may be laminated.

The first separator film 11 is designed to protect the surface of the foreign-substance-removing adhesive layer 12 before use. The first separator film 11 is not particularly limited, and may be, for example, a general film such as a polyethylene terephthalate (PET) film, a polyethylene naphthalate (PEN) film, an acrylic film, or a cycloolefin polymer (COP) film.

The foreign-substance-removing adhesive layer 12 is designed to pick up foreign substances present on the surface of the substrate being the attachment target, and preferably has significantly lower adhesive power than the substrate-attaching adhesive layer 16. Materials suitable for the foreign-substance-removing adhesive layer 12 are adhesive materials classified to have weak adhesive power. Specific examples thereof include PF-AN422, PF-AN474 (both from Lintec Corporation), and ZBO-0421 (from Fujimori Kogyo Co., Ltd.). The adhesive power of the foreign-substance-removing adhesive layer 12 is preferably 0.05 to 1 N/25 mm width. An adhesive power value of lower than 0.05 N/25 mm width is likely to cause the adherend to peel off, which results in poor workability. An adhesive power value of higher than 1 N/25 mm width may be higher than the adhesive power values of the integrating adhesive layer 14 and the substrate-attaching adhesive layer 16, and may not allow easy peeling of the first separator film 11.

The foreign-substance-removing film 13 is designed to support the foreign-substance-removing adhesive layer 12. The foreign-substance-removing adhesive layer 12 and the foreign-substance-removing film 13 are collectively handled, and attachment and peeling of the foreign-substance-removing film 13 mean attachment and peeling of the foreign-substance-removing adhesive layer 12 at the same time. The foreign-substance-removing film 13 is not particularly limited, and may be, for example, a general film such as a polyethylene terephthalate (PET) film, a polyethylene naphthalate (PEN) film, an acrylic film, or a cycloolefin polymer (COP) film. The foreign-substance-removing film 13 may be colored. If colored, the foreign-substance-removing film 13 can be easily identified, and is therefore less likely to be confused with other films to be peeled off in the attachment process. Also, since the foreign-substance-removing film 13 is to be eventually removed from the substrate 100, there is no disadvantage of coloring.

The integrating adhesive layer 14 is designed to integrate the foreign-substance-removing film 13 and the optical film 17 in the laminated film 10, and preferably has significantly lower adhesive power than the substrate-attaching adhesive layer 16. Materials suitable for the integrating adhesive layer 14 are adhesive materials classified to have weak adhesive power. Specific examples thereof include PF-AN422, PF-AN474 (both from LINTEC Corporation), and ZBO-0421 (from Fujimori Kogyo Co., Ltd.). The adhesive power of the integrating adhesive layer 14 is preferably 0.05 to 1 N/25 mm width. An adhesive power value of lower than 0.05 N/25 mm width is likely to cause the adherend to peel off, which results in poor workability. An adhesive power value of higher than 1 N/25 mm width may be higher than the adhesive power value of the substrate-attaching adhesive layer 16, and may not allow easy peeling of the foreign-substance-removing film 13.

The second separator film 15 is designed to protect the surface of the substrate-attaching adhesive layer 16 before use. The second separator film 15 can minimize the chance that the surface of the substrate-attaching adhesive layer 16 used for attachment of the laminated film to the substrate is exposed to an atmosphere in which foreign substances are present. The second separator film 15 is not particularly limited, and may be, for example, a general film such as a polyethylene terephthalate (PET) film, a polyethylene naphthalate (PEN) film, an acrylic film, or a cycloolefin polymer (COP) film. The second separator film 15 may be colored. If colored, the second separator film 15 can be easily identified, and is therefore less likely to be confused with other films to be peeled off in the attachment process. Also, since the second separator film 15 is to be eventually removed from the substrate 100, there is no disadvantage of coloring.

In the case where both of the foreign-substance-removing film 13 and the second separator film 15 are colored, the colors for the films are preferably different from each other.

The substrate-attaching adhesive layer 16 is used to attach the optical film 17 to a substrate. The substrate-attaching adhesive layer 16 and the optical film 17 are collectively handled, and attachment and peeling of the optical film 17 mean attachment and peeling of the substrate-attaching adhesive layer 16 at the same time. Materials suitable for the substrate-attaching adhesive layer 16 are those that firmly stick to a substrate. Specific examples thereof include MO3014 (from Fujimori Kogyo Co., Ltd.), MCF-464, and NCF-619 (both from Lintec Corporation). The adhesive power of the substrate-attaching adhesive layer 16 is higher than the adhesive power of each of the foreign-substance-removing adhesive layer 12 and the integrating adhesive layer 14, and is specifically preferred to be 1 to 30 N/25 mm width. An adhesive power value of lower than 1 N/25 mm width may be lower than the adhesive power values of the foreign-substance-removing adhesive layer 12 and the integrating adhesive layer 14 which are lower layers, resulting in poor workability in a process such as peeling of the first separator film 11. An adhesive power value of higher than 30 N/25 mm width is likely to cause the adherend not to be easily peeled off, resulting in poor workability.

Also, an easy-peel treatment is performed on the surface of the second separator film 15 on the substrate-attaching adhesive layer 16 side, and thus the substrate-attaching adhesive layer 16 has a higher bond strength with the optical film 17 than with the second separator film 15.

Nonlimiting examples of the optical film 17 include films having an optical function, such as anti-reflective films, anti-glare films, and retardation films. The structure of the optical film 17 is not particularly limited, and the optical film 17 may have irregularities on the surface or may have a laminated structure. Examples of the structures (projections) constituting the irregularities include conical nanostructures. Specific examples of the optical film 17 having irregularities on the surface include moth-eye films having a moth-eye surface structure. Specific examples of the optical film 17 having a laminated structure include DBEF series from Sumitomo 3M Limited. Examples of the material of the optical film 17 include polyethylene terephthalate (PET), polyethylene naphthalate (PEN), acrylic compounds, cycloolefin polymer (COP).

The laminated film of Embodiment 1 described above can, by the attachment method shown in FIG. 2, prevent entry of foreign substances and air bubbles in an interface between the attached surfaces when the optical film 17 is attached to a substrate in the atmosphere in which foreign substances such as dust are floating and are on the substrate.

(2) Method for Attaching Laminated Film

Figure 2:
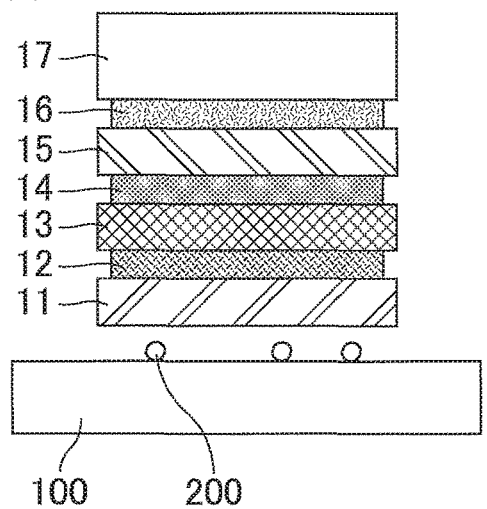
FIG. 2 includes schematic cross-sectional views for describing a method for attaching the laminated film of Embodiment 1 to a substrate.
Figure 2:
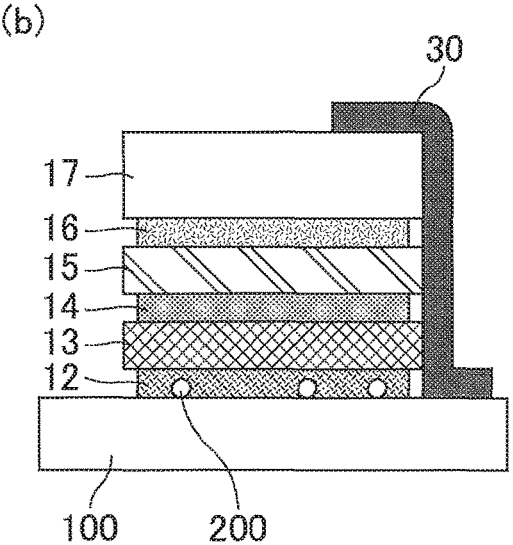
Figure 2:
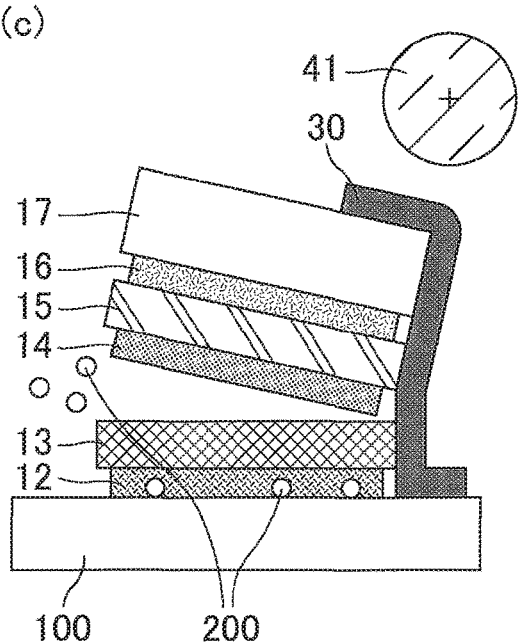
Figure 2:
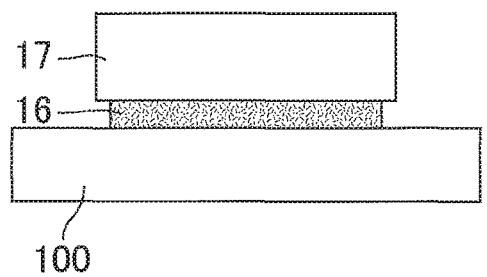

FIG. 2 includes schematic cross-sectional views for describing a method for attaching the laminated film of Embodiment 1 to a substrate. Hereinafter, the attachment procedure of the laminated film of Embodiment 1 is described based on FIG. 2.

(Step 1) Alignment

The laminated film 10 and the substrate 100 are aligned. At this time, the laminated film 10 may be fixed on the substrate 100 by attaching one end side of the laminated film 10 to the substrate 100 by a connection component such as tape 30. In the case where a relatively large foreign substance or dirt is present on the substrate 100, the surface of the substrate 100 may be cleaned before the laminated film 10 is attached to the surface of the substrate 100. In environments other than the environments in which foreign substances are artificially removed such as a cleanroom environment or vacuum, foreign substances 200 such as dust are usually floating in the air, and thus the foreign substances 200 are sticking to the surface of the substrate 100 which is the attachment target as illustrated in the view (a) in FIG. 2. The substrate 100 may be of any type, and may be a glass plate or a resin film, for example.

(Step 2) Attachment of Laminated Film 10

The first separator film 11 is peeled off to expose the foreign-substance-removing adhesive layer 12. In this state, as illustrated in the view (b) in FIG. 2, the laminated film 10 is attached to the substrate 100. Thereby, the foreign-substance-removing adhesive layer 12 and the surface of the substrate 100 are brought into close contact with each other, so that the foreign substances 200 sticking to the surface of the substrate 100 are caught by the foreign-substance-removing adhesive layer 12. In the case where the fixation using the tape 30 has not been performed in the above (Step 1) Alignment, one end side of the laminated film 10 is attached by the tape 30 to the vicinity of the region of the substrate 100 with the laminated film 10 attached thereto, whereby the laminated film 10 is fixed on the substrate 100. The tape 30 is attached to an end of the optical film 17 that is on the top of the laminated film 10. Also, preferably, while the first separator film 11 is peeled off, the exposed foreign-substance-removing adhesive layer 12 is consecutively pressed onto the substrate 100 with a roller. Thereby, it is possible to prevent entry of air bubbles between the surface of the substrate 100 and the foreign-substance-removing adhesive layer 12, enabling suitable removal of the foreign substances 200 from the entire surface of the substrate 100.

(Step 3) Separation of Foreign-Substance-Removing Film 13 and Optical Film 17

When the second separator film 15 is lifted while the foreign-substance-removing film 13 is pressed down, the foreign-substance-removing film 13 and the second separator film 15 are separated as illustrated in the view (c) in FIG. 2. As a result, the laminated film 10 is open in a V shape. In the view (c) in FIG. 2, the integrating adhesive layer 14 is on the second separator film 15 side, but may remain on the foreign-substance-removing film 13.

(Step 4) Removal of Foreign-Substance-Removing Film 13 and Attachment of Optical Film 17

An end of the foreign-substance-removing film 13 and an end of the second separator film 15 are peeled off from the tape 30. As the ends of the two films 13 and 15 on the tape 30 side are simultaneously pulled out of the region between the substrate 100 and the optical film 17, the optical film 17 is consecutively pressed onto the substrate 100 by an attachment roller 41. Thereby, the substrate 100 and the substrate-attaching adhesive layer 16 come into close contact with each other, so that the optical film 17 is attached to the surface of the substrate 100 with the substrate-attaching adhesive layer 16 in between as illustrated in the view (d) in FIG. 2. The ends of the two films 13 and 15 on the tape 30 side can easily be simultaneously pulled out of the region between the substrate 100 and the optical film 17 by a jig such as a later-described pick-up stick.

When the foreign-substance-removing film 13 is peeled off, the foreign substances 200 on the substrate 100 are removed to expose a clean surface of the substrate 100. When the second separator film 15 is peeled off, the substrate-attaching adhesive layer 16 is exposed. Immediately after the exposure of the surface of the substrate 100, the substrate-attaching adhesive layer 16 is attached to the surface to prevent entry of foreign substances in the interface between the attached surfaces. In order to continuously attach the optical film 17 while preventing entry of foreign substances in the interface between the attached surfaces, the foreign-substance-removing adhesive layer 12 and the second separator film 15 are preferably peeled off by winding each of the foreign-substance-removing film 13 and the second separator film 15 on a winding roller, and the substrate-attaching adhesive layer 16 is preferably brought into close contact with the substrate by pressing the layer with the attachment roller. In order to minimize entry of foreign substances in the interface between the attached surfaces, the peeling speed (film winding speed) for the two films 13 and 15 and the moving speed (film attachment speed) of the attachment roller 41 are preferably made the same. From the viewpoint of continuously attaching the optical film 17, the peeling speed for the two films 13 and 15 may be equal to or higher than the moving speed of the attachment roller 41.

In the present embodiment, since the attachment is performed in the state where the optical film 17 is fixed by the tape 30, the optical film 17 can be precisely attached to the region from which the foreign substances 200 are removed. Furthermore, since the region from which the foreign substances 200 are removed is covered with the optical film 17 after the foreign-substance-removing film 13 is peeled off, the foreign substances such as dust in the surrounding air can also be prevented from sticking to the surface before attachment of the optical film 17.

(Step 5) Removal of Tape

When the tape 30 is removed, attachment of the optical film 17 to the substrate 100 is completed as illustrated in the view (d) in FIG. 2.

The attachment method described above enables attachment of the optical film 17 to the substrate 100 without entry of the foreign substances 200 and air bubbles in the interface between the attached surfaces even in a typical room environment. Also, since the method is a dry attachment method that does not employ a liquid differently from a conventional attachment method that utilizes soapy water, the work time can be greatly shortened, and contamination of the work environment can be prevented. Furthermore, the precision of the attachment of the optical film 17 can be increased by using a jig (described in detail layer) to peel off the foreign-substance-removing film 13 and the second separator film 15.

(3) Method for Producing Laminated Film

Figure 3:
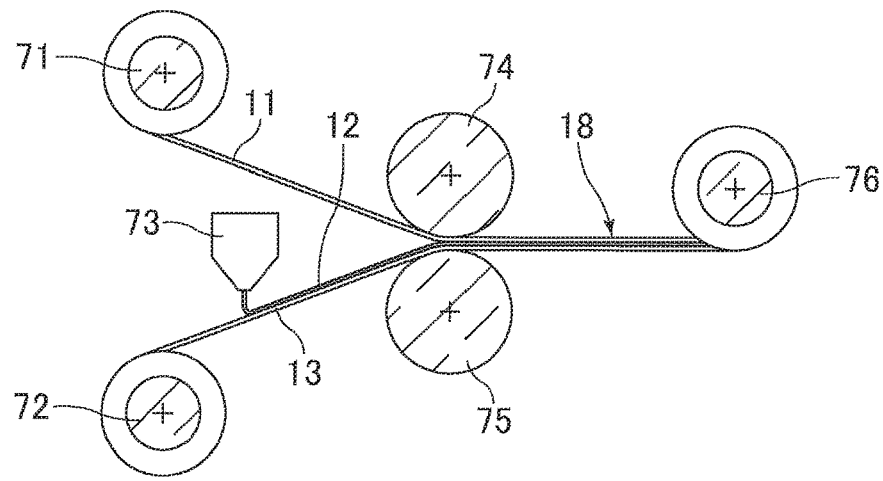
FIG. 3 includes views for explaining production of a first intermediate of the laminated film of Embodiment 1, with a view (a) illustrating the production flow and a view (b) being a schematic cross-sectional view illustrating the structure of the first intermediate.
Figure 3:
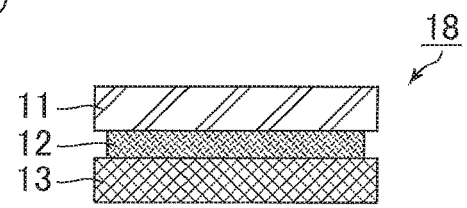
Figure 4:
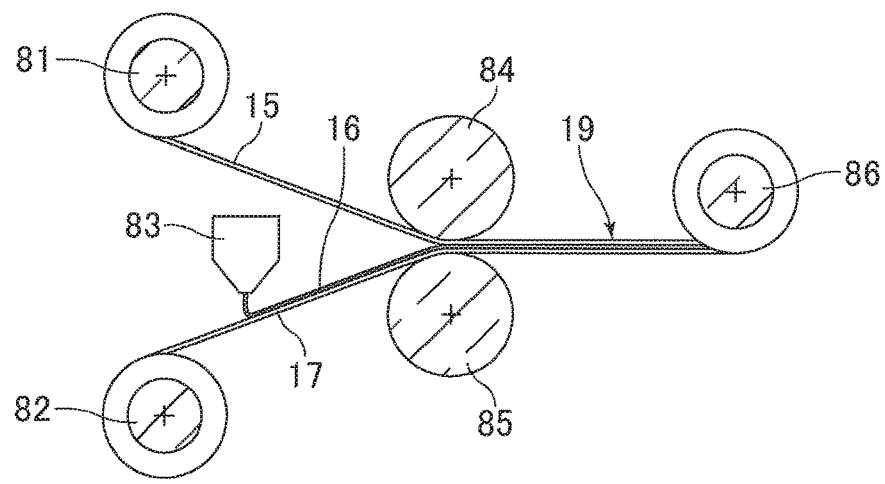
FIG. 4 includes views for explaining production of a second intermediate of the laminated film of Embodiment 1, with a view (a) illustrating the production flow and a view (b) being a schematic cross-sectional view illustrating the structure of the second intermediate.
Figure 4:
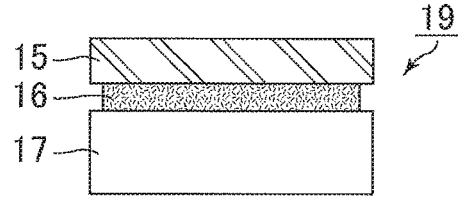
Figure 5:
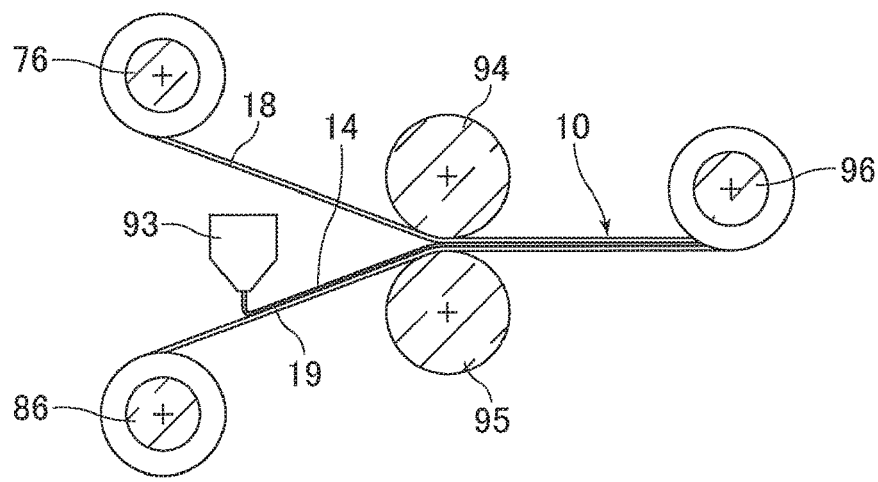
FIG. 5 is a view illustrating the production flow for the laminated film of Embodiment 1 using the first and second intermediates.

The method for producing the laminated film 10 of Embodiment 1 is not particularly limited, and may be the roll-to-roll process. The case of producing the laminated film of Embodiment 1 by the roll-to-roll process is described with reference to FIGS. 3 to 5. FIG. 3 includes views for explaining production of a first intermediate of the laminated film of Embodiment 1, with a view (a) illustrating the production flow and a view (b) being a schematic cross-sectional view illustrating the structure of the first intermediate. FIG. 4 includes views for explaining production of a second intermediate of the laminated film of Embodiment 1, with a view (a) illustrating the production flow and a view (b) being a schematic cross-sectional view illustrating the structure of the second intermediate. FIG. 5 is a view illustrating the production flow for the laminated film of Embodiment 1 using the first and second intermediates.

A first intermediate 18 is produced by attaching the first separator film 11 and the foreign-substance-removing film 13 with the foreign-substance-removing layer 12. As illustrated in the view (a) in FIG. 3, the first separator film 11 wound into a roll is consecutively sent out to a laminator provided with rollers 74 and 75 as the roller 71 is rotated. Similarly, the foreign-substance-removing film 13 wound into a roll is consecutively sent out to the laminator as a roller 72 is rotated. An adhesive material-supplying device 73 in front of the laminator applies an adhesive material as a material of the foreign-substance-removing adhesive layer 12 to one of the surfaces of the foreign-substance-removing film 13. The adhesive material is dried and/or cured, so that the foreign-substance-removing adhesive layer 12 is formed. The first separator film 11 and the foreign-substance-removing film 13 joined are pressure-bonded by the rollers 74 and 75 of the laminator. Here, the surface of the foreign-substance-removing film 13 on which the foreign-substance-removing adhesive layer 12 is formed faces the first separator film 11. The bonding integrates the first separator film 11, the foreign-substance-removing adhesive layer 12, and the foreign-substance-removing film 13 into the first intermediate 18 illustrated in the view (b) in FIG. 3. The film-shaped first intermediate 18 is temporarily wound around a roller 76.

A second intermediate 19 is produced by attaching the second separator film 15 and the optical film 17 with the substrate-attaching adhesive layer 16. As illustrated in the view (a) in FIG. 4, the second separator film 15 wound into a roll is consecutively sent out to a laminator provided with rollers 84 and 85 as a roller 81 is rotated. Similarly, the optical film 17 wound into a roll is consecutively sent out to the laminator as a roller 82 is rotated. An adhesive material-supplying device 83 in front of the laminator applies an adhesive material as a material of the substrate-attaching adhesive layer 16 to one of the surfaces of the optical film 17. The adhesive material is dried and/or cured, so that the substrate-attaching adhesive layer 16 is formed. The second separator film 15 and the optical film 17 joined are pressure-bonded by the rollers 84 and 85 of the laminator. Here, the surface of the optical film 17 on which the substrate-attaching adhesive layer 16 is formed faces the second separator film 15. The bonding integrates the second separator film 15, the substrate-attaching adhesive layer 16, and the optical film 17 into the second intermediate 19 illustrated in the view (b) in FIG. 4. The film-shaped second intermediate 19 is temporarily wound around a roller 86.

The laminated film 10 of Embodiment 1 is produced by attaching the first intermediate 18 and the second intermediate 19 with the integrating adhesive layer 14. As illustrated in FIG. 5, the first intermediate 18 wound into a roll is consecutively sent out to a laminator provided with rollers 94 and 95 as the roller 76 is rotated. Similarly, the second intermediate 19 wound into a roll is consecutively sent out to the laminator as the roller 86 is rotated. An adhesive material-supplying device 93 in front of the laminator applies an adhesive material as a material of the integrating adhesive layer 14 to the surface of the second intermediate 19 on which the second separator film 15 is formed. The adhesive material is dried and/or cured, so that the integrating adhesive layer 14 is formed. The first intermediate 18 and the second intermediate 19 joined are pressure-bonded by the rollers 94 and 95 of the laminator. In the bonding, the surface of the first intermediate 18 on which the first separator film 11 is formed and the surface of the second intermediate 19 on which the integrating adhesive layer 14 is formed are brought into close contact with each other. The bonding integrates the first intermediate 18, the integrating adhesive layer 14, and the second intermediate 19 into the laminated film 10 illustrated in FIG. 1. Thereafter, the laminated film 10 is wound around a roller 96.

The films used in the production method described above can be commercially available films. In the case where a commercially available film having the same structure as the first intermediate 18 or the second intermediate 19 can be found, the film can be used to skip the procedure illustrated in FIG. 3 or 4.

Each of the films preferably has a thickness of from 20 μm inclusive to 100 μm inclusive. Although a certain thickness is required to ensure the strength, thinner films are more easily handled, and thick films may not be easily wound.

Also, the surface of the foreign-substance-removing film 13 in the first intermediate 18 to which the integrating adhesive layer 14 is to be attached is preferably surface-treated for a decrease in the bond strength with the integrating adhesive layer 14. Examples of the surface treatment include treatments of coating the surface with a material to which an adhesive material does not adhere easily, such as a fluorine compound or a silicon compound.

Embodiment 2

In Embodiment 2, the method for attaching the laminated film is described in more detail.

1. Attachment Method (A-1)

Figure 6:
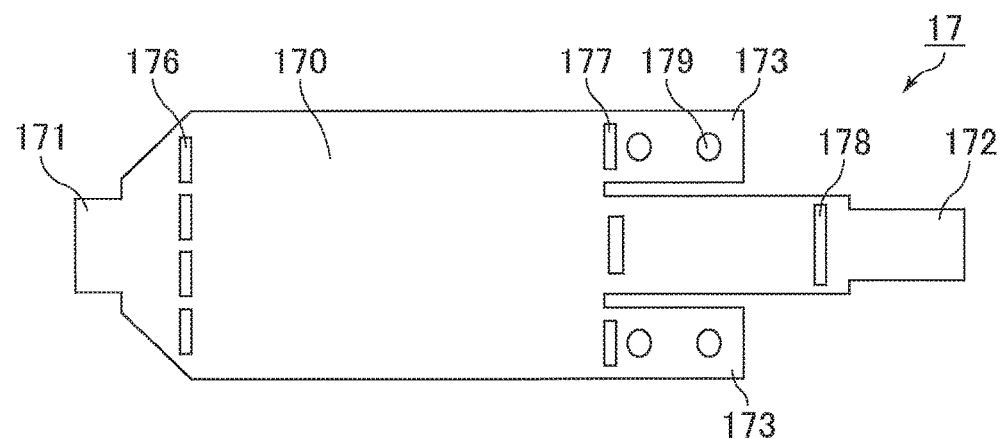
FIG. 6 is a schematic plan view illustrating the initial shape of a laminated film in an attachment method (A-1).

Hereinafter, the attachment method (A-1) is described with reference to FIGS. 6 to 16. FIG. 6 is a schematic plan view illustrating the initial shape of a laminated film in an attachment method (A-1). First, the laminated film 10 having the cross-sectional structure illustrated in FIG. 1 is punched out into the initial shape illustrated in FIG. 6. In the laminated film 10 of the initial shape, the first separator film 11, the foreign-substance-removing film 13, the second separator film 15, and the optical film 17 have the same shape. The initial shape of the laminated film 10 is described below based on the initial shape of the optical film 17. The initial shape of the optical film 17 is like a band including, in the longitudinal direction thereof, a first pull portion (extension portion for pulling) 171, an attachment portion (body) 170, and a second pull portion (extension portion for pulling) 172 in the given order from the left side in FIG. 6. The second pull portion 172 corresponds to the side to be fixed by a connection component such as the tape 30.

In the border between the first pull portion 171 and the attachment portion 170 and the border between the attachment portion 170 and the second pull portion 172, slits (cut slits) 176 and 177 are respectively provided in the direction perpendicular to the longitudinal direction of the film. The slits 176 and 177 are guides for cutting the film after the use. From the viewpoint of preventing creases in the optical film 17 upon pulling of the second pull portion 172, the slit 177 positioned in the border between the attachment portion 170 and the second pull portion 172 may not be provided.

The first pull portion 171 is formed to be narrower than the attachment portion 170 such that it is subjected to uniform tension when pulled. The attachment portion 170 corresponds to the portion to be attached to the substrate 100. The second pull portion 172 is also formed to be narrower than the attachment portion 170 similarly to the first pull portion 171. The second pull portion 172 is provided with a slit 178. The second separator film 15 and the foreign-substance-removing film 13 are respectively provided with slits 138 and 158 at the positions corresponding to the slit 178 of the optical film 17. These slits are used to pull out the second separator film 15 and the foreign-substance-removing film 13 collectively. That is, by passing a second pull portion 152 of the second separator film 15 through the slit 138 of the foreign-substance-removing film 13 or passing a second pull portion 132 of the foreign-substance-removing film 13 through the slit 158 of the second separator film 15, the two films 13 and 15 can be peeled off collectively.

Figure 7:
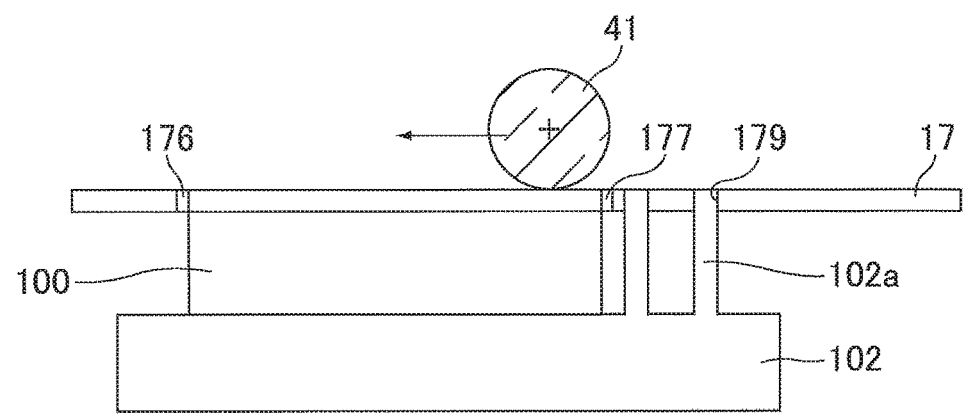
FIG. 7 is a schematic cross-sectional view illustrating a method for fixing the laminated film on a fixing base in the attachment method (A-1).

The optical film 17 of the initial shape also includes an extension portion 173 formed in parallel with the second pull portion 172 at each side of the second pull portion 172. The two extension portions 173 each are provided with openings 179 for positioning. FIG. 7 is a schematic cross-sectional view illustrating a method for fixing the laminated film on a fixing base in the attachment method (A-1). As illustrated in FIG. 7, when positioning pins 102a of a fixing base 102 are inserted into the respective openings 179 for positioning, the position of the laminated film 10 can be fixed on the fixing base 102.

Thereafter, each of the films 11, 13, 15, and 17 constituting the laminated film 10 is processed into the desired shape. Changes in the shape of each of the films 11, 13, 15, and 17 during the processing are illustrated in FIGS. 8, 9, 15, and 16. In these drawings, the view (a) illustrates the optical film, the view (b) illustrates the second separator film, the view (c) illustrates the foreign-substance-removing film, and the view (d) illustrates the first separator film.

Since the films 11, 13, 15, and 17 may be individually processed or the two films 13 and 15 may be processed in combination, the films 11, 13, 15, and 17 constituting the laminated film 10 may be in different colors from each other such that the user can distinguish between the films 11, 13, 15, and 17. Also, colored films will be convenient for explaining how to use the laminated film 10. The second separator film 15, the foreign-substance-removing film 13, and the first separator film 11 are to be disposed of after the use, and thus can be colored without problems. In contrast, the optical film 17 is preferably not colored because coloring affects the optical properties.

Figure 8:
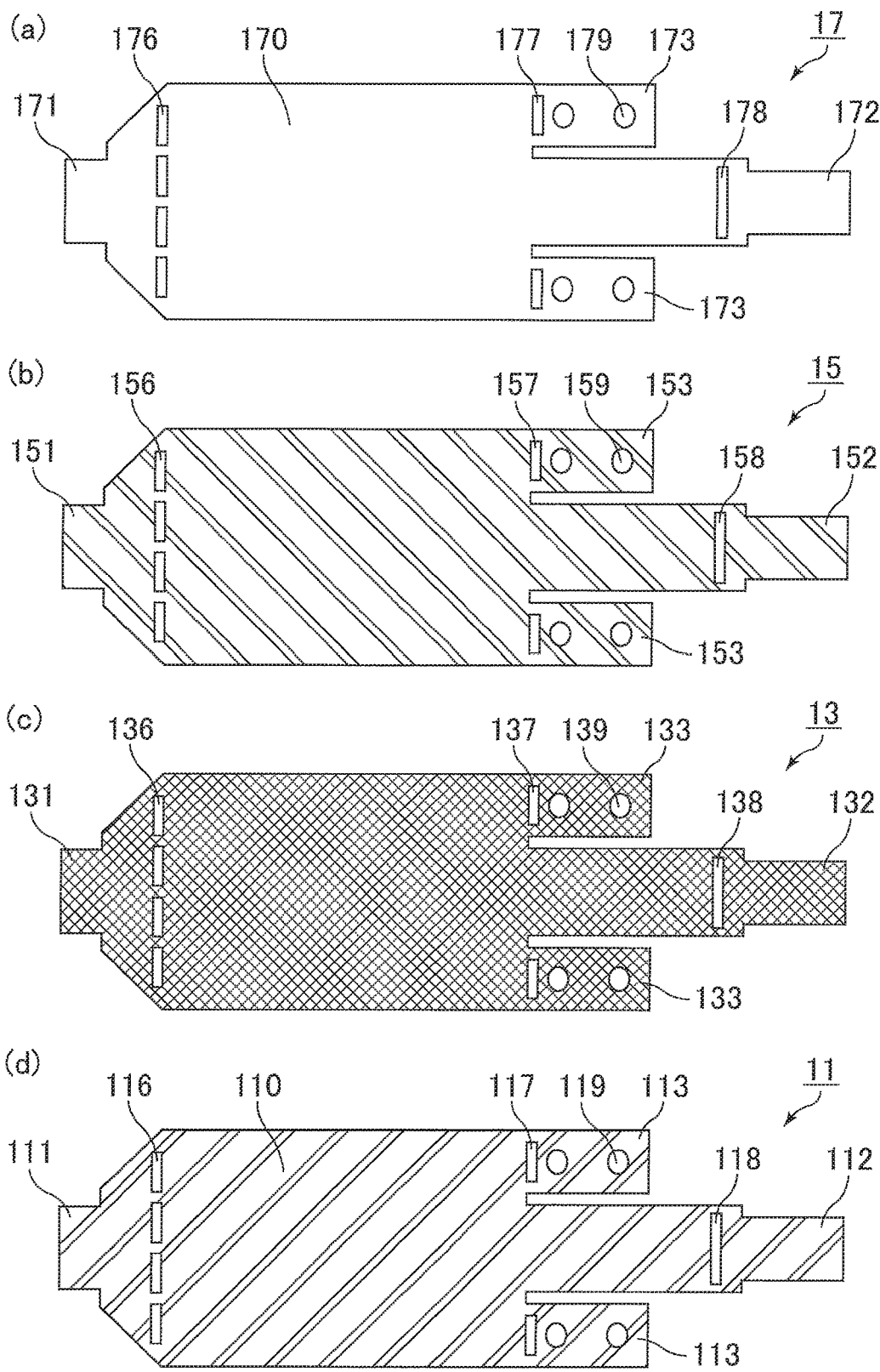
FIG. 8 includes views each illustrating the plan shape of a film constituting the laminated film immediately after punching in the attachment method (A-1).
Figure 9:
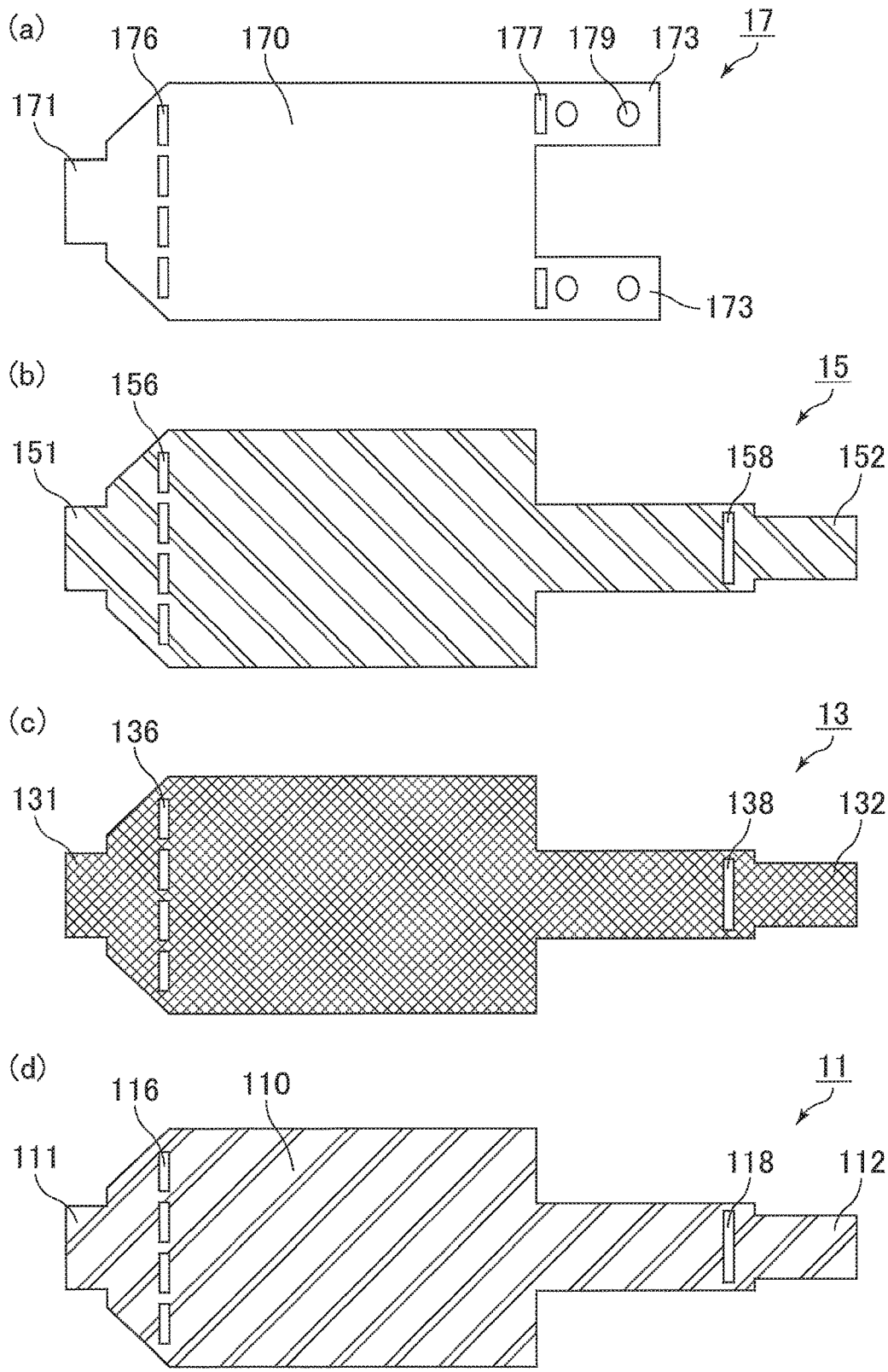
FIG. 9 includes views each illustrating the plan shape of a film constituting the laminated film after pre-treatment in the attachment method (A-1).

FIG. 8 includes views each illustrating the plan shape of a film constituting the laminated film immediately after punching in the attachment method (A-1). FIG. 9 includes views each illustrating the plan shape of a film constituting the laminated film after pre-treatment in the attachment method (A-1). In the pretreatment, the second separator film 15, the foreign-substance-removing film 13, and the first separator film 11 are respectively cut along the slits 117, 137, and 157 by a cutting tool such as scissors, so that the extension portions 113, 133, and 153 provided with positioning pins 119, 139, and 159 are removed. In contrast, the second pull portions (extension portions for pulling) 112, 132, and 152 are left. As to the optical film 17, the second pull portion 172 is removed. After the pretreatment, the laminated film 10 is fixed on the fixing base 102 illustrated in FIG. 7.

Figure 10:
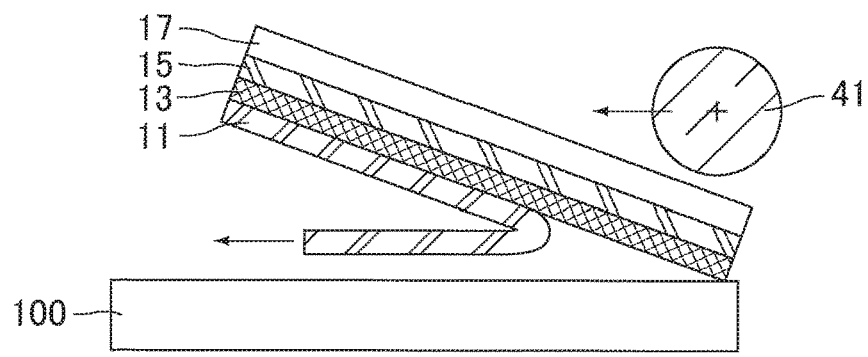
FIG. 10 is a view illustrating a method for removing a first separator film in the attachment method (A-1).

FIG. 10 is a view illustrating a method for removing a first separator film in the attachment method (A-1). As illustrated in FIG. 10, the second pull portion 112 of the first separator film 11 is folded down toward the attachment portion 110, and is pulled to pull out the first separator film 11 from the lower side (the substrate 100 side) of the laminated film 10. At the same time, the laminated film 10 is attached by the attachment roller 41. As a result, the laminated film 10 from which the first separator film 11 has been removed is attached to the substrate 100.

Figure 11:
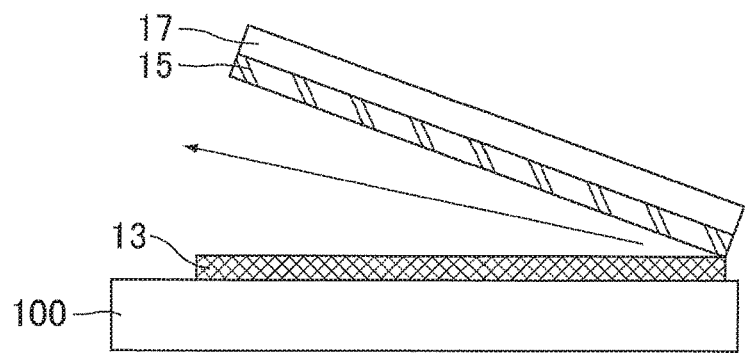
FIG. 11 is a view illustrating the state where a foreign-substance-removing film and a second separator film are separated from each other in the attachment method (A-1).

FIG. 11 is a view illustrating the state where a foreign-substance-removing film and a second separator film are separated from each other in the attachment method (A-1). After the laminated film 10 is attached to the substrate 100, the second separator film 15 and the optical film 17 only are pulled up such that the foreign-substance-removing film 13 and the second separator film 15 are separated. Then, the second pull portion (132 or 152) of one of the second separator film 15 and the foreign-substance-removing film 13 is passed through the slit (138 or 158) of the other of the films, so that the two films 13 and 15 are peeled off collectively. From the viewpoint of preventing entry of the foreign substances 200 under the optical film 17 before the attachment, the foreign-substance-removing film 13 and the second separator film 15 are preferably pulled in the same direction.

Figure 12:
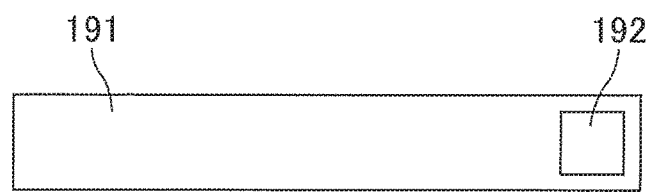
FIG. 12 is a view illustrating a pick-up stick used to pull out the foreign-substance-removing film and the second separator film in the attachment method (A-1).
Figure 13:
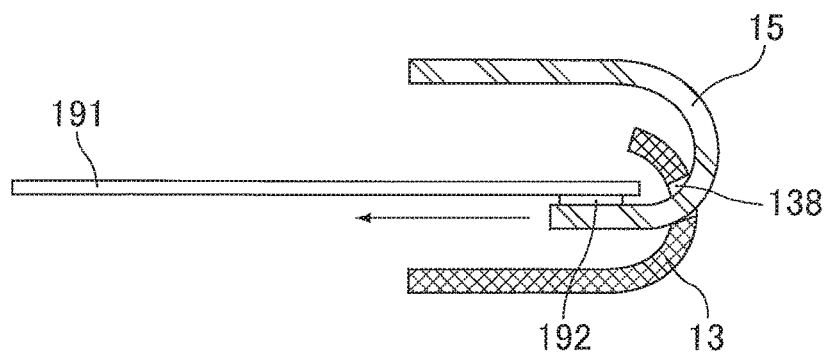
FIG. 13 is a view illustrating the state where the pick-up stick is attached to the integrated foreign-substance-removing film and second separator film in the attachment method (A-1).

FIG. 12 is a view illustrating a pick-up stick used to pull out the foreign-substance-removing film and the second separator film in the attachment method (A-1). FIG. 13 is a view illustrating the state where the pick-up stick is attached to the integrated foreign-substance-removing film and second separator film in the attachment method (A-1). A pick-up stick 191 having double-sided tape 192 mounted at an end thereof as illustrated in FIG. 12 is inserted between the foreign-substance-removing film 13 and the second separator film 15 separated from each other. Then, as illustrated in FIG. 13, the double-sided tape 192 is attached to the integrated second separator film 15 and foreign-substance-removing film 13. Although the double-sided tape 192 is attached to the second separator film 15 in FIG. 13, the double-sided tape 192 may be attached to the foreign-substance-removing film 13.

Nonlimiting examples of the material of the stick include metals and resins. Also, nonlimiting examples of the shape of the stick include thin plates.

Figure 14:
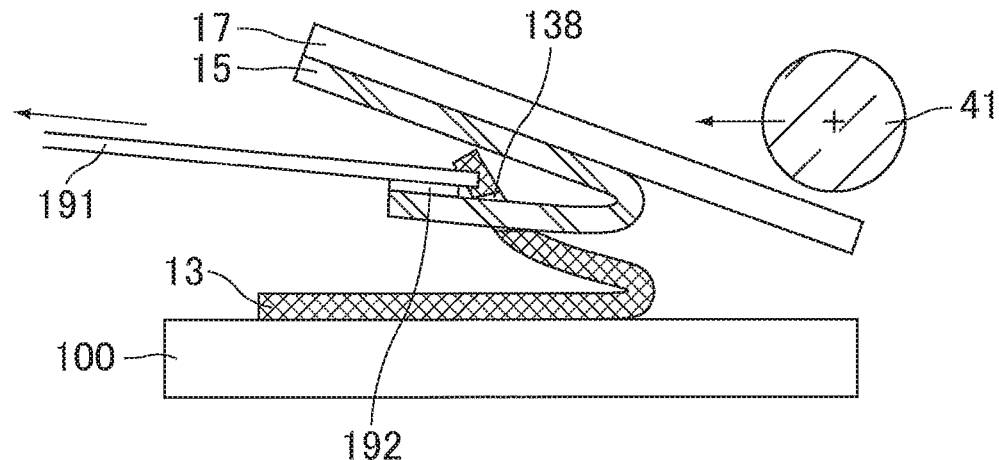
FIG. 14 is a schematic view illustrating the state where the foreign-substance-removing film and the second separator film are pulled out in the attachment method (A-1).

FIG. 14 is a schematic view illustrating the state where the foreign-substance-removing film and the second separator film are pulled out in the attachment method (A-1). As illustrated in FIG. 14, while the integrated second separator film 15 and foreign-substance-removing film 13 are pulled out by pulling the pick-up stick 191, the optical film 17 is attached to the substrate 100 by the attachment roller 41.

Figure 15:
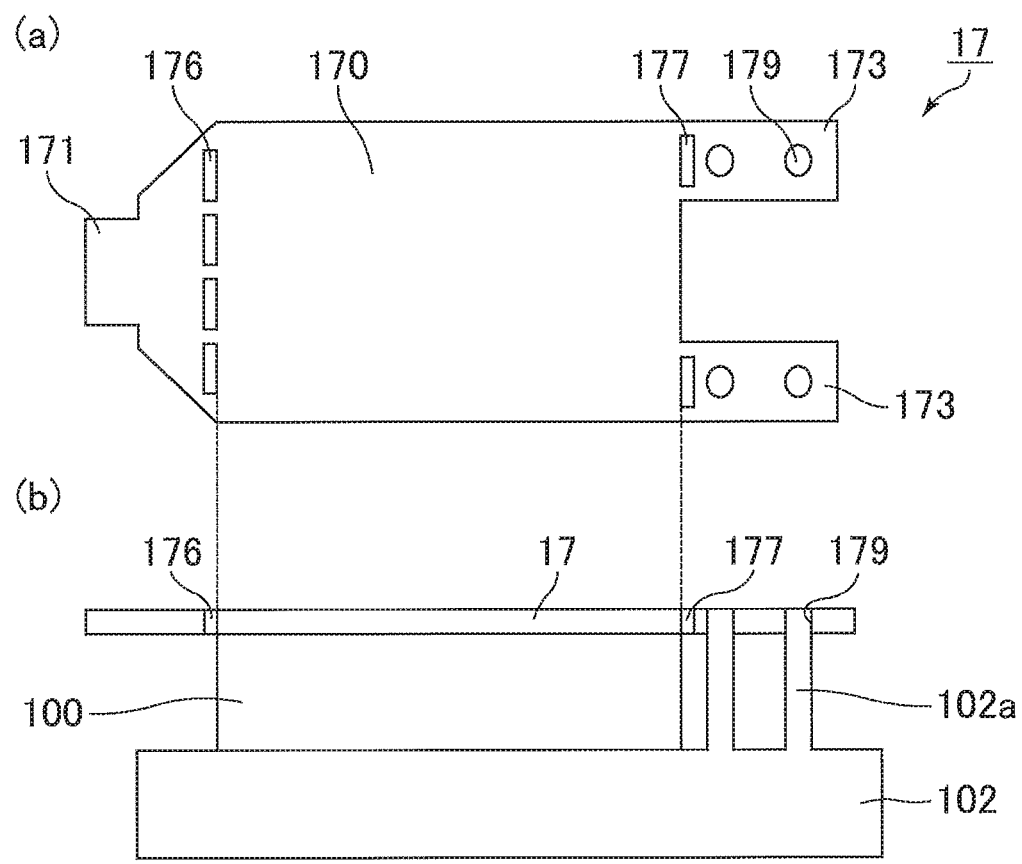
FIG. 15 includes views each illustrating the state immediately after attachment of an optical film to a substrate in the attachment method (A-1).
Figure 16:
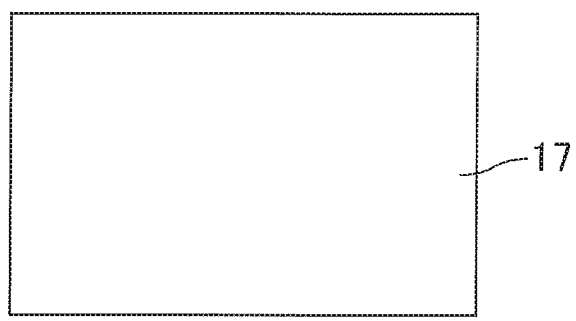
FIG. 16 includes views each illustrating a final state of the optical film attached to the substrate in the attachment method (A-1).
Figure 16:
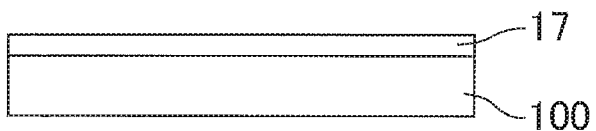

FIG. 15 includes views each illustrating the state immediately after attachment of an optical film to a substrate in the attachment method (A-1). FIG. 16 includes views each illustrating a final state of the optical film attached to the substrate in the attachment method (A-1). In both FIGS. 15 and 16, the view (a) illustrates a plan view and the view (b) illustrates a cross-sectional view. As illustrated in FIG. 15, the optical film 17 immediately after being attached to the substrate 100 is different from the optical film 17 of the initial shape in that the second pull portion 172 has been cut off. After that, the first pull portion 171 and the two extension portions 173 are cut off to obtain the shape illustrated in FIG. 16.

2. Attachment Method (A-2)

Hereinafter, the attachment method (A-2) is described with reference to FIGS. 17 to 20.

First, the laminated film 10 having the cross-sectional structure illustrated in FIG. 1 is punched out into the initial shape illustrated in FIG. 6. The initial shape is the same as that in the attachment method (A-1).

Each of the films 11, 13, 15, and 17 constituting the laminated film 10 punched out into the initial shape illustrated in FIG. 6 is processed into the desired shape. Changes in the shape of each of the films 11, 13, 15, and 17 during the processing are illustrated in FIGS. 17 to 20. In these drawings, the view (a) illustrates the optical film, the view (b) illustrates the second separator film, the view (c) illustrates the foreign-substance-removing film, and the view (d) illustrates the first separator film.

Figure 17:
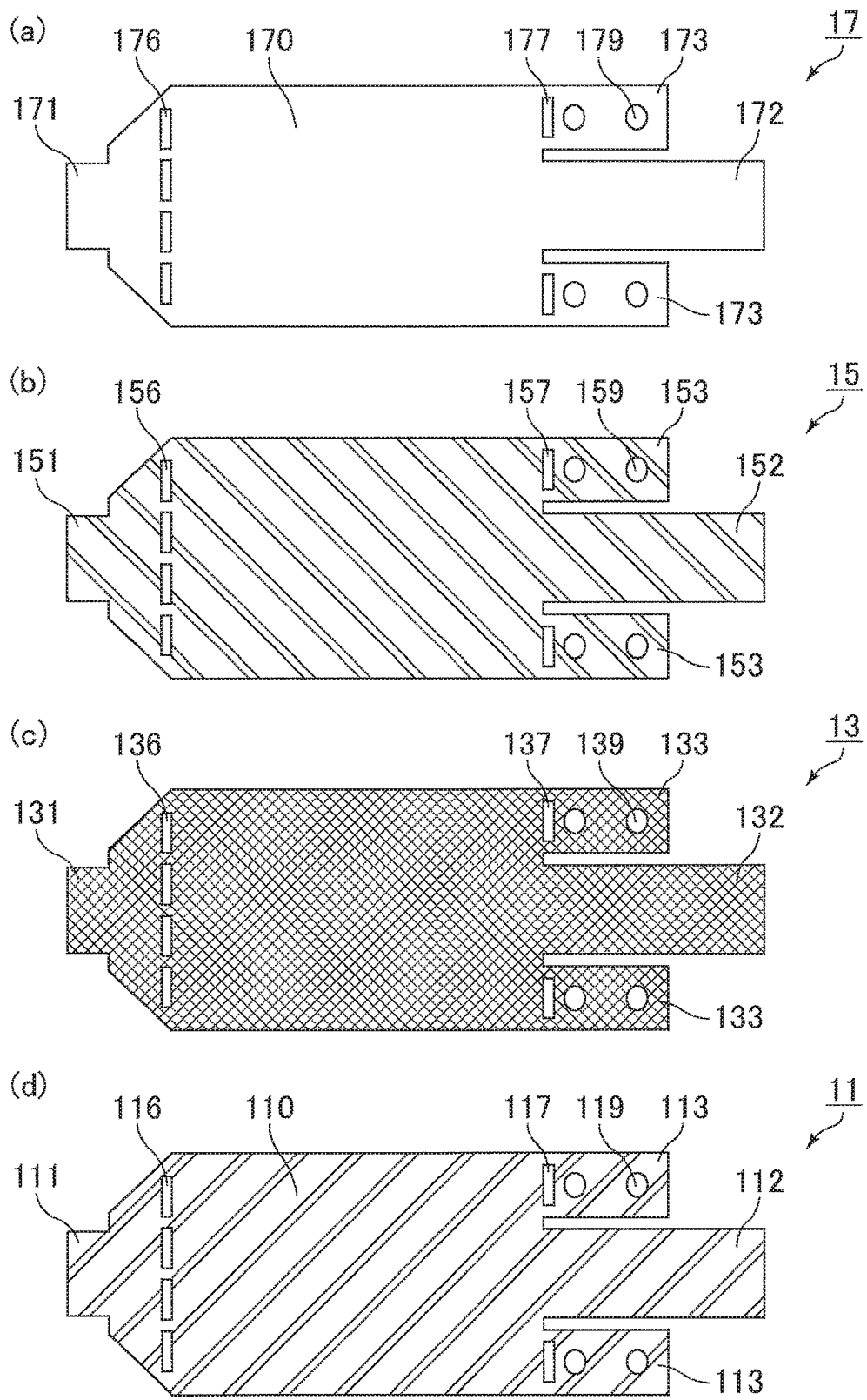
FIG. 17 includes views each illustrating the plan shape of a film constituting a laminated film immediately after punching in an attachment method (A-2).
Figure 18:
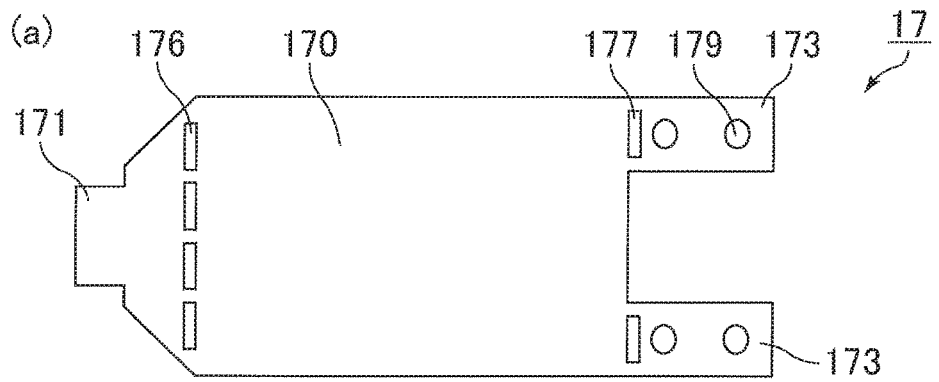
FIG. 18 includes views each illustrating the plan shape of a film constituting the laminated film after pre-treatment in the attachment method (A-2).
Figure 18:
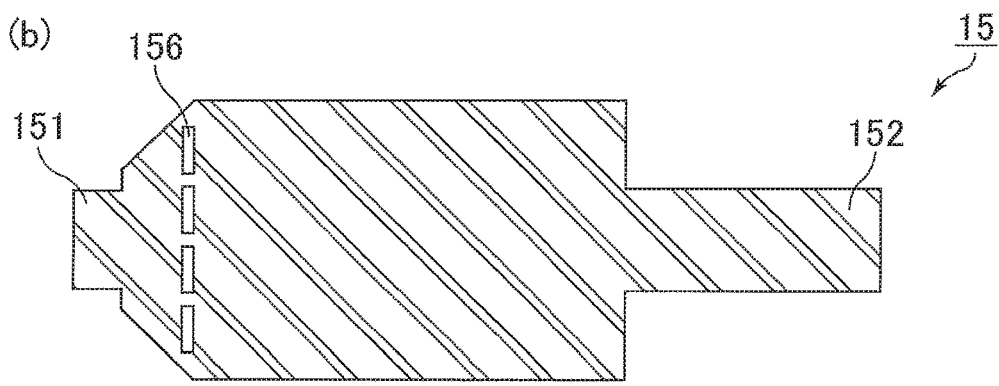
Figure 18:
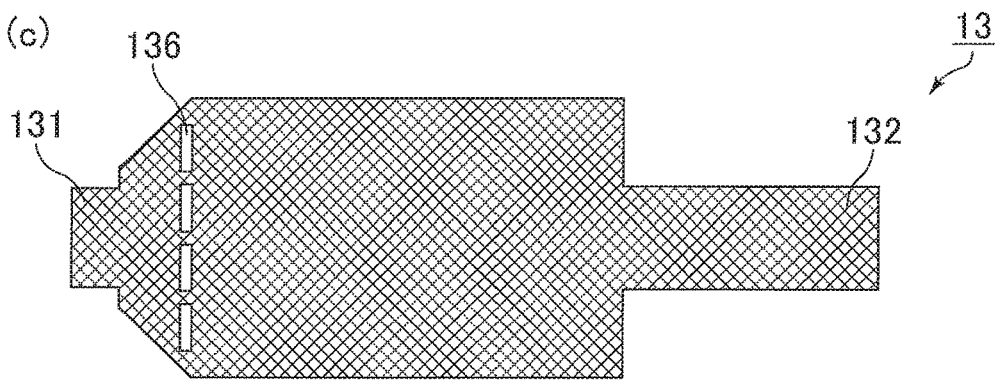
Figure 18:
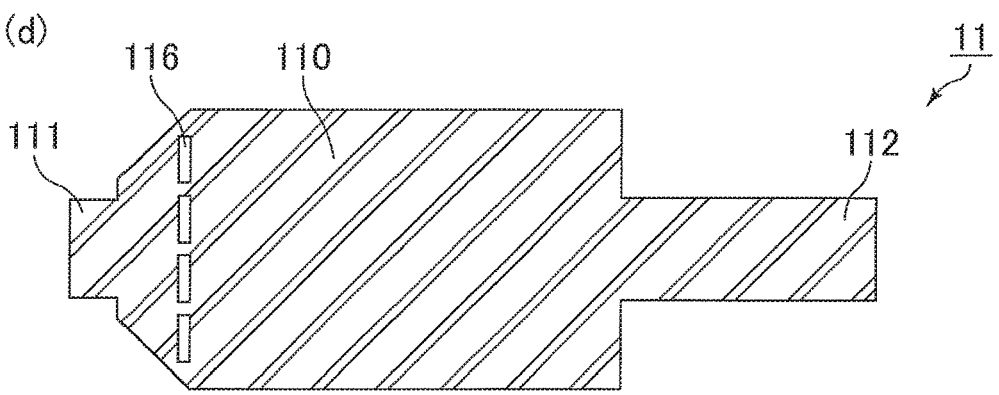

FIG. 17 includes views each illustrating the plan shape of a film constituting a laminated film immediately after punching in an attachment method (A-2). FIG. 18 includes views each illustrating the plan shape of a film constituting the laminated film after pre-treatment in the attachment method (A-2). In the pretreatment, the second separator film 15, the foreign-substance-removing film 13, and the first separator film 11 are respectively cut along the slits 117, 137, and 157 by a cutting tool such as scissors, so that the second pull portions 112, 132, and 152 provided with positioning pins 119, 139, and 159 are removed. As to the optical film 17, the second pull portion 172 is removed.

Figure 19:
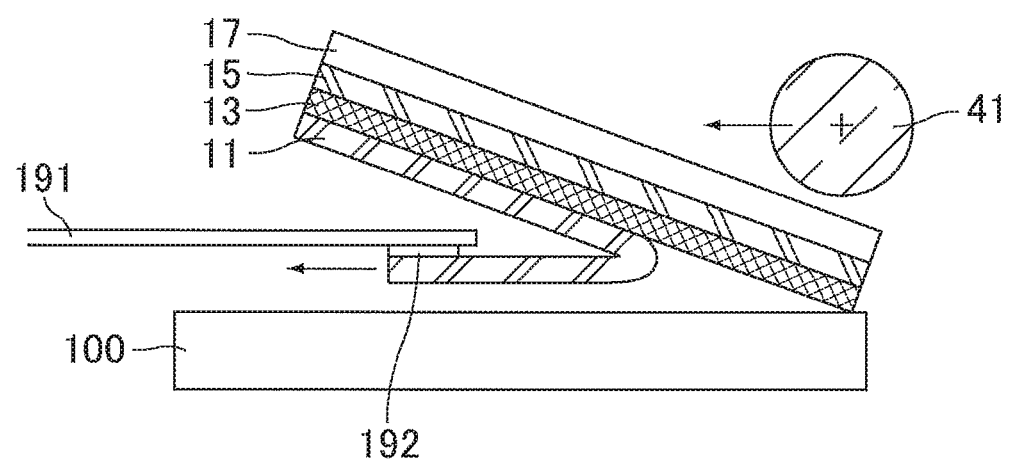
FIG. 19 is a view illustrating a method for removing a first separator film in the attachment method (A-2).

FIG. 19 is a view illustrating a method for removing a first separator film in the attachment method (A-2). As illustrated in FIG. 19, the second pull portion 112 of the first separator film 11 is folded down toward the attachment portion 110, and is pulled to pull out the first separator film 11 from the lower side (the substrate 100 side) of the laminated film 10. At the same time, the laminated film 10 is attached by the attachment roller 41. As a result, the laminated film 10 from which the first separator film 11 has been removed is attached to the substrate 100. In the attachment method (A-2), the first separator film 11 is pulled out by the pick-up stick 191.

The foreign-substance-removing film 13 and the second separator film 15 are separated by the same procedure as in the attachment method (A-1).

Figure 20:
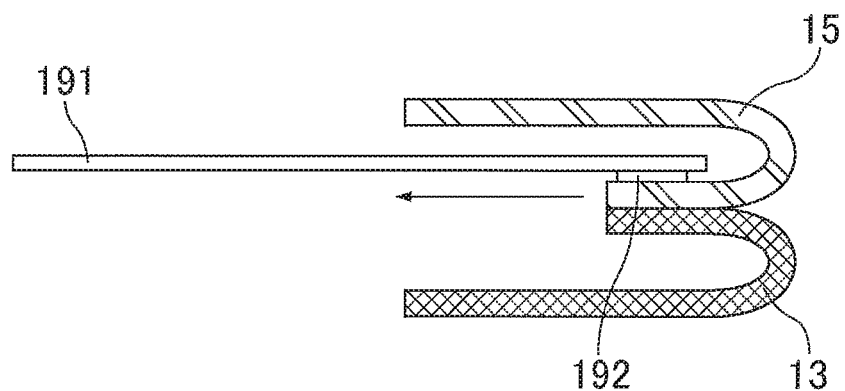
FIG. 20 is a schematic view illustrating the state where the foreign-substance-removing film and the second separator film are pulled out in the attachment method (A-2).

FIG. 20 is a schematic view illustrating the state where the foreign-substance-removing film and the second separator film are pulled out in the attachment method (A-2). The pick-up stick 191 having the double-sided tape 192 mounted at an end thereof is inserted between the foreign-substance-removing film 13 and the second separator film 15 separated from each other. Then, as illustrated in FIG. 20, the double-sided tape 192 is attached to the integrated second separator film 15 and foreign-substance-removing film 13. While the integrated second separator film 15 and foreign-substance-removing film 13 are pulled out by pulling the pick-up stick 191, the optical film 17 is attached to the substrate 100 by the attachment roller.

The technique of integrating the second separator film 15 and the foreign-substance-removing film 13 in the attachment method (A-2) is different from that in the attachment method (A-1). That is, the second separator film 15 and the foreign-substance-removing film 13 each are folded inside, and the films are integrated by the foreign-substance-removing adhesive layer 12. At this time, an adhesive material such as double-sided tape or glue may be additionally used, or the integrating adhesive layer 14 may be used. Thereafter, the pick-up stick 191 is inserted between the foreign-substance-removing film 13 and the second separator film 15 separated from each other, and the double-sided tape 192 at an end of the pick-up stick 191 is bonded to the joint portion of the films 13 and 15. While the films 13 and 15 are pulled out, the optical film 17 is pressed by the attachment roller, so that the optical film 17 is attached to the substrate 100. The first pull portion 171 and the two extension portions 173 of the optical film 17 are then cut off, whereby attachment of the optical film 17 is completed.

3. Attachment Method (A-3)

Hereinafter, the attachment method (A-3) is described with reference to FIGS. 21 and 22. The attachment method (A-3) is the same as the attachment method (A-1) except for the pulling method of the foreign-substance-removing film 13 and the second separator film 15 by the pick-up stick.

Figure 21:
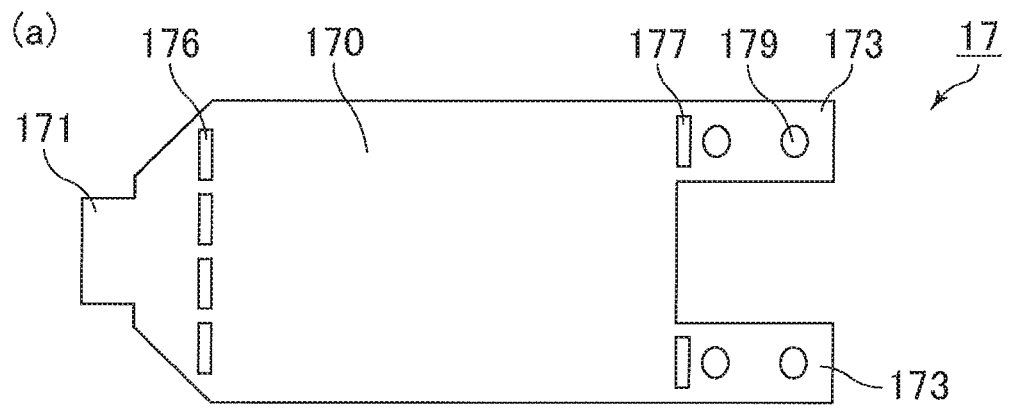
FIG. 21 includes views each illustrating the plan shape of a film constituting the laminated film before pulling in an attachment method (A-3).
Figure 21:
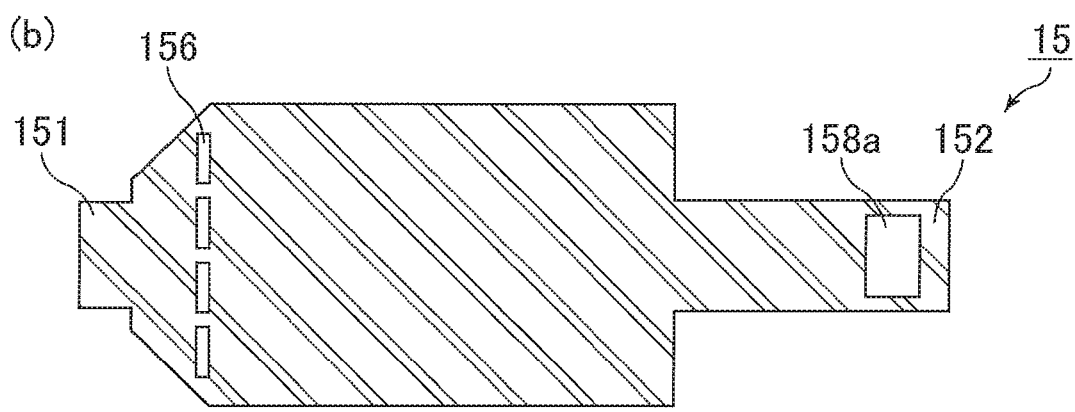
Figure 21:
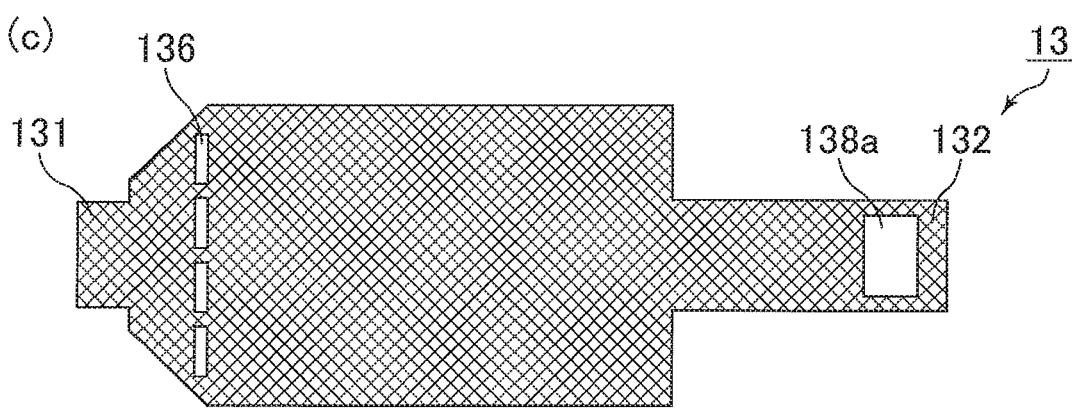

FIG. 21 includes views each illustrating the plan shape of a film constituting the laminated film before pulling in an attachment method (A-3). As illustrated in FIG. 21, the pull portions 132 and 152 of the foreign-substance-removing film 13 and the second separator film 15 are respectively provided with openings 138a and 158a for pulling. The openings 138a and 158a are designed to be aligned to each other when the foreign-substance-removing film 13 and the second separator film 15 are attached to each other at the pull portions 132 and 152 by the attachment method (A-1) or (A-2).

Figure 22:
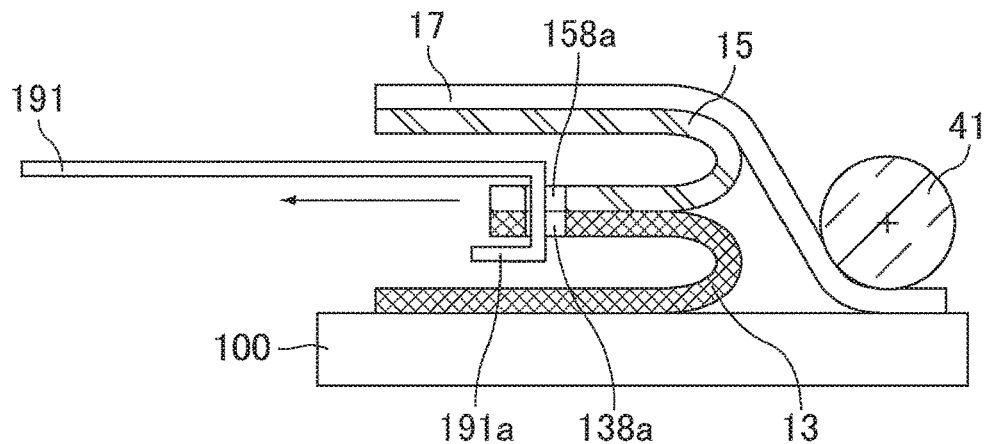
FIG. 22 is a schematic view illustrating the state where the foreign-substance-removing film and the second separator film are pulled out in the attachment method (A-3).

FIG. 22 is a schematic view illustrating the state where the foreign-substance-removing film and the second separator film are pulled out in the attachment method (A-3). As illustrated in FIG. 22, in the attachment method (A-3), the pick-up stick 191 having a hook 191a at an end thereof is used. The hook 191a is put in the openings 138a and 158a of the foreign-substance-removing film 13 and the second separator film 15. In this state, while the films 13 and 15 are pulled out, the optical film 17 is pressed by the attachment roller, so that the optical film 17 is attached to the substrate 100.

The pick-up stick 191 having the hook 191a at an end thereof can be, for example, a metal wire processed to have a J-shaped end, a uniaxially stretched sheet such as a uniaxially stretched polythiophene having a high elastic modulus or polyoxy methylene (POM), a biaxially stretched sheet such as PET, PEN, polyacrylate, polystyrene, or polyolefin, or an unstretched sheet. A composite material of these materials can also be used. The structure of the body of the pick-up stick 191 may be a film-like strip. In this case, the hook 191a is additionally attached to an end of the body of the film-like pick-up stick 191.

4. Attachment Method (B)

In the attachment methods (A-1) to (A-3), there are regions which are not used in the finished product, such as the pull portions (the left one and the right one, two portions), the two extension portions for positioning, and the punching residue generated due to the non-quadrangle shape. In the case where the materials of the components such as the optical film 17 are expensive, such waste parts not used in the later processes are preferably minimized. The following attachment method (B) enables reduction in waste parts not used in the later processes.

Figure 23:
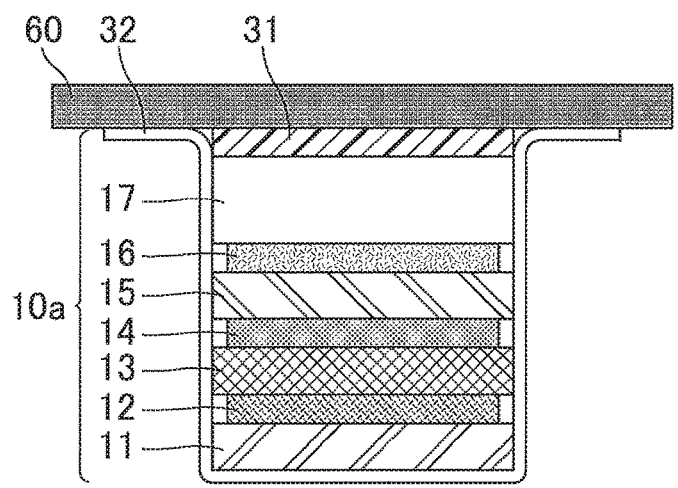
FIG. 23 is a schematic cross-sectional view illustrating the structure of a film used in an attachment method (B).
Figure 24:
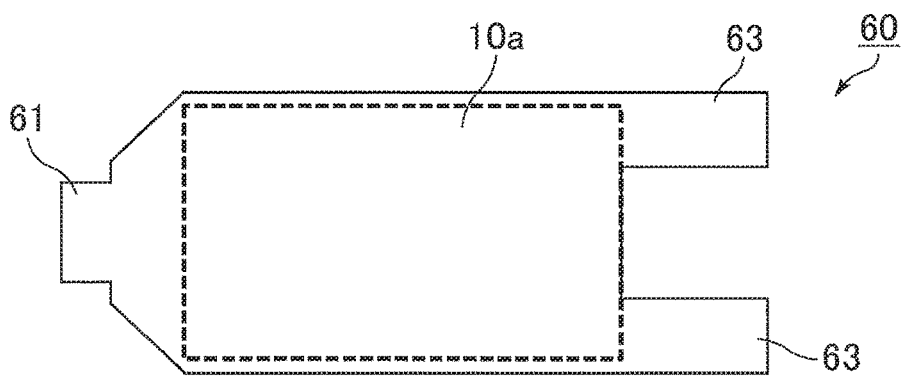
FIG. 24 is a schematic plan view illustrating the structure of the film used in the attachment method (B).

FIG. 23 is a schematic cross-sectional view illustrating the structure of a film used in an attachment method (B). FIG. 24 is a schematic plan view illustrating the structure of the film used in the attachment method (B). A laminated film 10a in the attachment method (B) has a structure including the first separator film 11, the foreign-substance-removing adhesive layer 12, the foreign-substance-removing film 13, the integrating adhesive layer 14, the second separator film 15, the substrate-attaching adhesive layer 16, the optical film 17, and an adhesive layer 31 in the given order, and including a third separator film 32 entirely covering the laminate from the first separator film 11 side. The laminated film 10a is cut into a quadrangular shape to suit the display screen except for the third separator film 32. To the optical film 17 side is attached an attachment lead film 60 which is a substitute for the peripheral portions such as a first pull portion. The attachment lead film 60 has a structure including similar portions to the peripheral portions eventually removed by cutting in the attachment methods (A-1) to (A-3). Specifically, the attachment lead film 60 includes a first pull portion 61 and extension portions 63. Here, no slits to be cut are provided because the attachment lead film 60 may be peeled off from the optical film 17 after the use.

When the foreign-substance-removing film 13 and the second separator film 15 are pulled out, a pick-up stick having double-sided tape attached to each surface of the plate-like end thereof, or a pick-up stick having a hook at an end thereof can be used. In the case of using a pick-up stick having double-sided tape attached thereto, the following procedure can be used, for example. That is, each of the foreign-substance-removing film 13 and the second separator film 15 is peeled off from at an end to a site about 5 mm from the end. The double-sided tape on one of the surfaces of the end of the pick-up stick is attached to the peeled portion of the foreign-substance-removing film 13. The double-sided tape on the other of the surfaces is attached to the peeled portion of the second separator film 15. Then, the pick-up stick is pulled, whereby the foreign-substance-removing film 13 and the second separator film 15 can be simultaneously pulled out. The pulling direction is not particularly limited, and may be parallel to the extension direction of the attachment lead film 60 or may be diagonal to the laminated film 10a.

Figure 25:
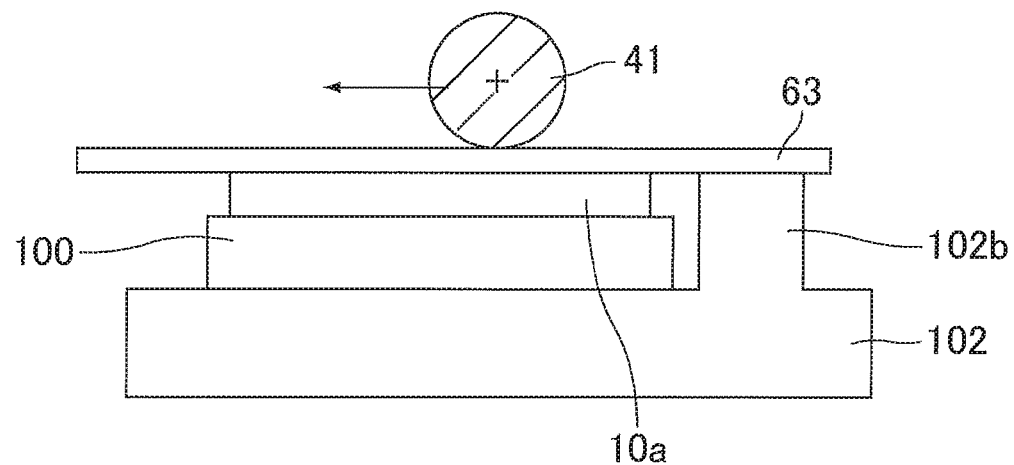
FIG. 25 is a view illustrating a method for fixing the film in the attachment method (B).

FIG. 25 is a view illustrating a method for fixing the film in the attachment method (B). An adhesive material is provided on the surface of each of the extension portions 63 of the attachment lead film 60. As illustrated in FIG. 25, the adhesive material on the surface of each of the extension portions 63 and a projection 102b of the fixing base 102 are bonded to each other, so that the attachment lead film 60 is fixed. Since the fixation is performed using an adhesive material, the precision level required for punching of the stretching potions 63 may be lower than that required for the case of inserting pins in the openings provided in the extension portions 63. Also, since the attachment lead film 60 has a single-layered structure, the film can be easily punched out with high precision.

As illustrated in FIG. 23, before shipping, the laminated film 10 and the attachment lead film 60 are covered with the third separator film 32 from the first separator film 11 side such that the exposed adhesive materials are covered. Thereby, troubles can be prevented such as that the attachment lead film 60 sticks to the working table or to another film during working.

Since the attachment method (B) eliminates the cut-off process required in the attachment methods (A) and just includes peeling of the attachment lead film 60, the attachment process is simple. Therefore, the attachment method (B) is advantageous in that the ends of the optical film 17 can be processed neatly even when the laminated films are shipped to the user in the state illustrated in FIGS. 23 and 24.

Embodiment 3

Figure 26:
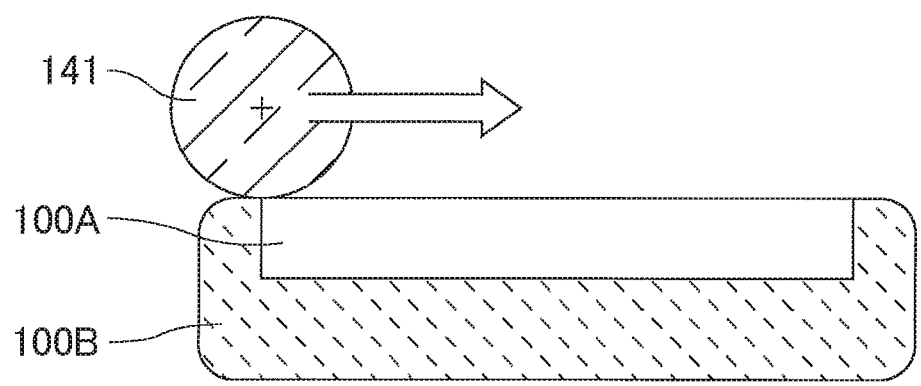
FIG. 26 is an explanatory view illustrating attachment of a laminated film to a substrate having no irregularities on the surface.
Figure 27:
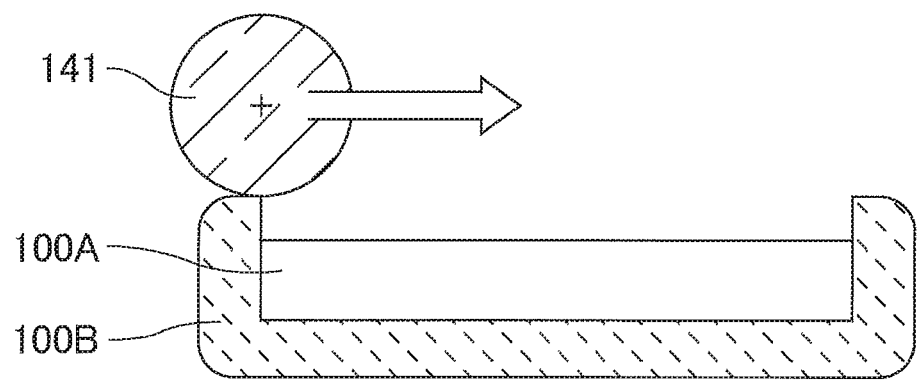
FIG. 27 is an explanatory view illustrating attachment of a laminated film to a substrate having irregularities on the surface.

Embodiment 3 describes the case where the functional film is attached to a substrate with an uneven portion on the surface (the peripheral covering portion). Examples of the substrate with an uneven portion on the surface include display devices including a frame portion (outer frame) around the display portion. Such a display device has an uneven portion as a border between the display portion and the frame portion, and each of the four sides of the rectangular display portion may form an uneven portion. In particular, middle- to large-sized display devices such as laptop screens, monitors, and TVs often have uneven portions. As illustrated in FIG. 26, in the case of a substrate which includes no uneven portions formed by the upper surface of a display portion (which may be a front plate) 100A and the upper surface of a frame portion 100B and includes no irregularities on the surface, it is easy to attach the laminated film of Embodiment 1 to the surface by pressing the film with the attachment roller 141. However, as illustrated in FIG. 27, in the case of a substrate which has protrusions on the outer periphery, if the laminated film to be pressed has the same structure as the laminated film of Embodiment 1, the heights of the protrusions on the outer periphery are higher than the thickness of the laminated film to be pressed. Since the width of the attachment roller 141 is generally greater than the width of the substrate to be pressed, such protrusions on the outer periphery may come into contact with the attachment roller 141 to hinder the attachment roller 141 from pressing the surface of the workpiece, leading to a failure of the attachment. FIG. 26 is an explanatory view illustrating attachment of a laminated film to a substrate having no irregularities on the surface. FIG. 27 is an explanatory view illustrating attachment of a laminated film to a substrate having irregularities on the surface.

Figure 28:
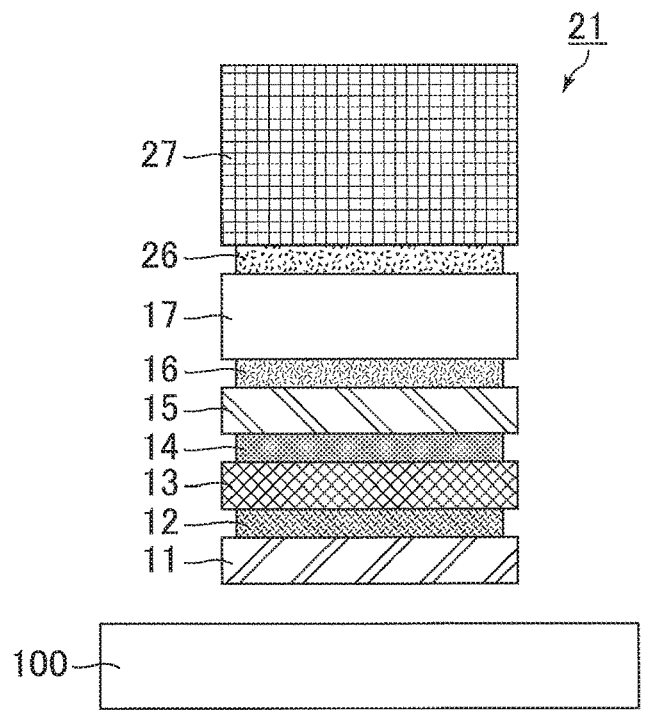
FIG. 28 is a schematic cross-sectional view illustrating one example of a laminated film including a cushion layer according to Embodiment 3.
Figure 29:
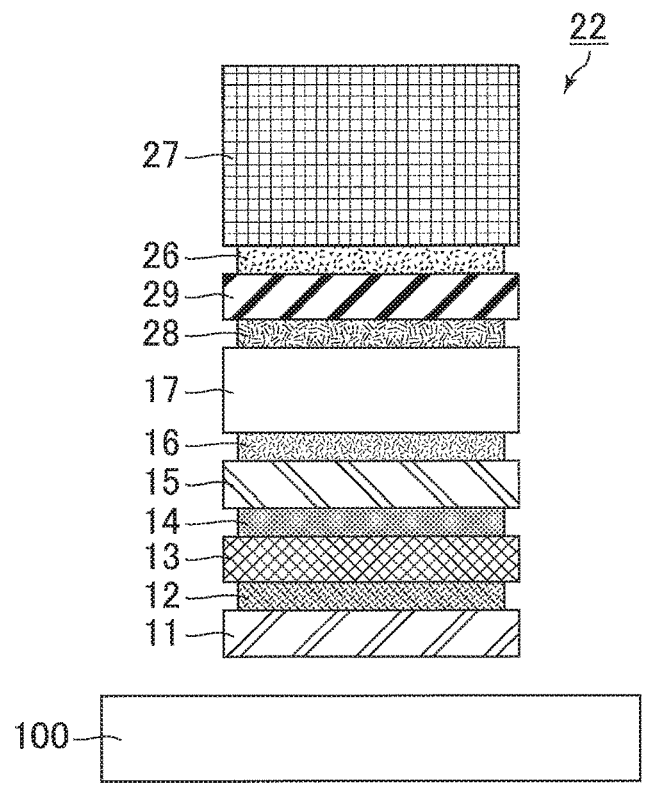
FIG. 29 is a schematic cross-sectional view illustrating another example of the laminated film including a cushion layer according to Embodiment 3.

In order to attach the functional film to a substrate with irregularities on the surface, the laminated film of Embodiment 3 includes a cushion layer (buffer layer) formed from an elastic body on the side of the optical film (functional film) 17 in Embodiment 1 opposite to the side where the optical film 17 is in contact with the substrate-attaching adhesive layer 16. FIG. 28 is a schematic cross-sectional view illustrating one example of a laminated film including a cushion layer according to Embodiment 3. FIG. 29 is a schematic cross-sectional view illustrating another example of a laminated film including a cushion layer according to Embodiment 3. A laminated film 21 in FIG. 28 has a structure in which the cushion layer 27 is directly laminated on one surface of the optical film 17 with an adhesive layer 26 in between. A laminated film 22 in FIG. 29 has a structure in which a separator film 29 is laminated on one surface of the optical film 17 with an adhesive layer 28 in between. On the side of the separator film 29 opposite to the adhesive layer 28, the cushion layer 27 is laminated with the adhesive layer 26 in between.

Those suited for the cushion layer 27 are flexible and have a hardness with which the cushion layer 27 can maintain its film shape when peeled off. Suitable examples of the material of the cushion layer 27 include foamed bodies of resin materials. Suitable examples of the resin materials include urethane resins and butadiene resins. The cushion layer 27 can be, for example, urethane foam (trade name: Nippalay, 5-mm thick) from NHK Spring Co., Ltd.

Figure 30:
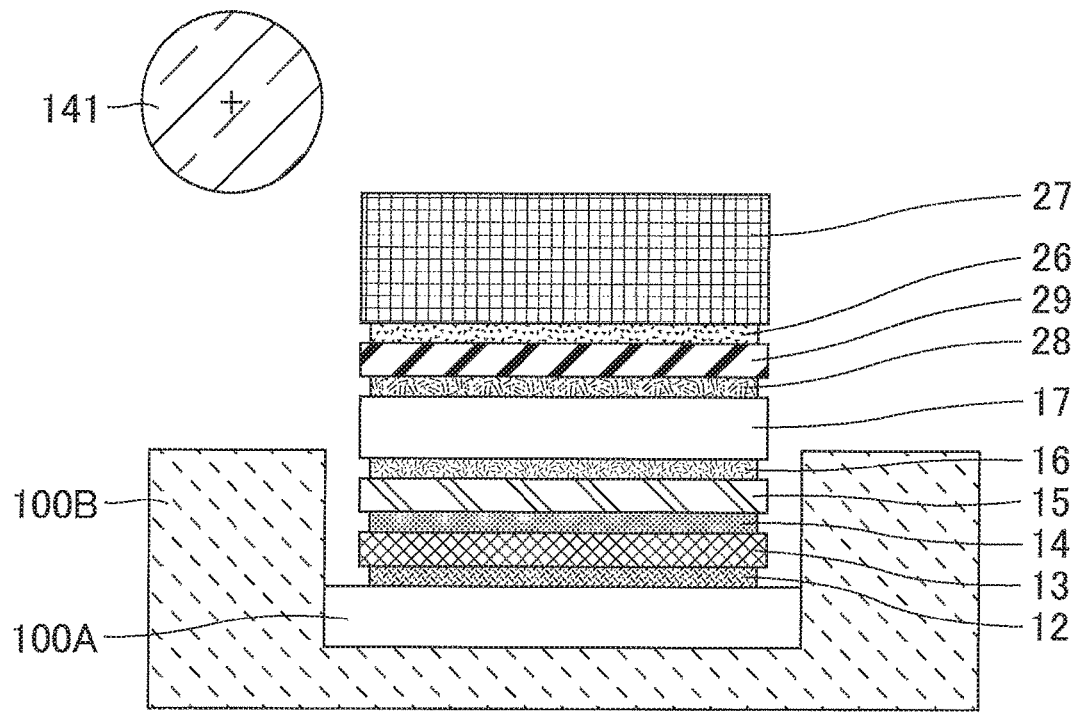
FIG. 30 is an explanatory view illustrating a laminated film attached to a substrate by a foreign-substance-removing adhesive layer.
Figure 31:
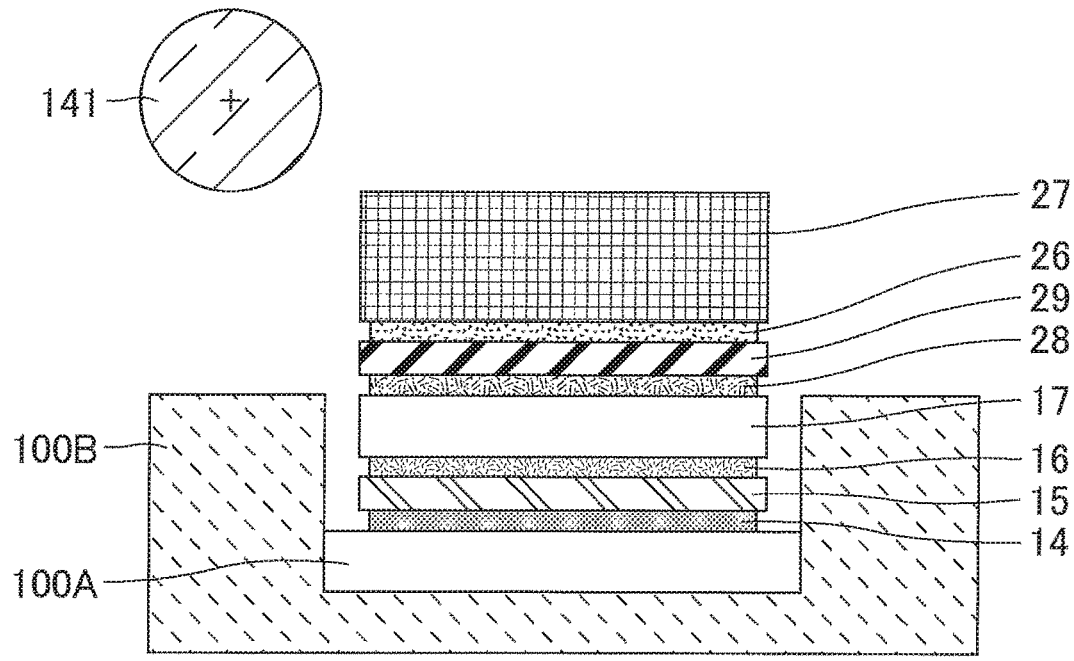
FIG. 31 is an explanatory view illustrating an optical film attached to a substrate.

The thickness of the cushion layer 27 is set to be appropriate for the size of the uneven portion on the substrate surface, and the cushion layer 27 preferably protrudes out from the upper end of the frame portion 100B (upper end of the uneven portion on the substrate surface) when the optical film 17 is attached to the substrate 100. That is, it is preferred that the total thickness of the optical film 17, the adhesive layer 28, and the cushion layer 27 (in the case of FIG. 28) or the total thickness of the optical film 17, the adhesive layer 28, the separator film 29, the adhesive layer 26, and the cushion layer 27 (in the case of FIG. 29) is larger than the thickness of the frame portion 100B, not in the state where the laminated film is attached to the substrate 100 by the foreign-substance removing adhesive layer 12 as illustrated in FIG. 30, but in the state where this foreign-substance-removing adhesive layer 12 is peeled off from the surface of the substrate 100 and the substrate-attaching adhesive layer 16 is brought into close contact with the substrate 100 so that the optical film 17 is attached to the substrate 100 as illustrated in FIG. 31. FIG. 30 is an explanatory view illustrating a laminated film attached to a substrate by a foreign-substance-removing adhesive layer. FIG. 31 is an explanatory view illustrating an optical film attached to a substrate. Also, the cushion layer 27 is preferably designed such that 50% or more of the cushion layer 27 protrudes from the upper end of the frame portion 100B when the optical film 17 is attached to the substrate 100. The cushion layer 27 is usually designed to be the thickest among the substrate-attaching adhesive layer 16, the optical film 17, the adhesive layer 26, the adhesive layer 28, and the separator film 29, and is designed to be, for example, about 0.5 mm to 10 mm. The material of each of the adhesive layers 26 and 28 is preferably an adhesive material suited for an optical material.

The optical film 17 and the layers thereunder in the case of the structure in FIG. 28, and the separator film 29 and the layers thereunder in the case of the structure in FIG. 29, are cut to suit the size of the attachment portion of the substrate 100, and are attached to the cushion layer 27 cut to be slightly smaller than the above layers, with a space left at the edge for the case of misalignment. Although the resulting roll as a product is large, the layers may be produced by the roll-to-roll process, and then the cushion layer 27 may be cut at the same time.

With a display (from Sharp Corporation: monitor display LL-171G-W), an attachment experiment was performed. The films such as the optical film 17 were cut at sites 3 mm inside the periphery. The height difference formed by the frame portion 100B and the display was about 2 mm. When attached, the laminated film protruded out from the outer frame by about +3.5 mm. When pressure is applied by the attachment roller, the pressure was transferred to the optical film 17 via the cushion layer 27. As a result, the attachment was performed without entry of foreign substances, and without attachment unevenness or generation of air bubbles due to insufficient attachment pressure.

Embodiment 4

In Embodiment 4, the structure of a display device including an uneven portion formed by the presence of the frame portion (outer frame) is described based on an exemplary liquid crystal display device.

Figure 32:
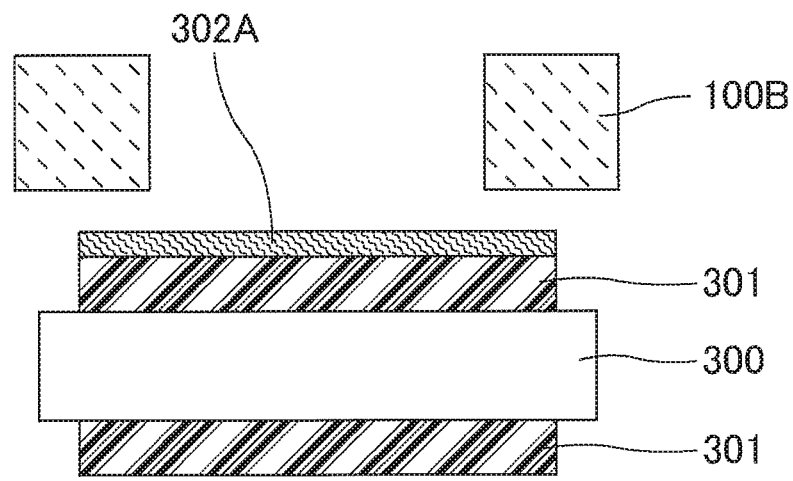
FIG. 32 is a schematic cross-sectional view illustrating the general structure of a conventional liquid crystal display device.

FIG. 32 is a schematic cross-sectional view illustrating the general structure of a conventional liquid crystal display device. As illustrated in FIG. 32, the conventional liquid crystal display device has an uneven portion as a border between the display surface of the liquid crystal panel 300 and the frame portion 100B. An optical film 302A laminated in the image display region of the liquid crystal panel 300 on the obverse side via a polarizer 301 is designed to be larger than the opening of the frame portion 100B which is open to correspond to the image display region of the liquid crystal panel 300, so that the end surface of the optical film 302A is not in the opening of the frame portion 100B. With such a structure, the frame portion 100B needs to be removed when the optical film 302A is changed, which may have required breaking of the frame portion 100B.

Figure 33:
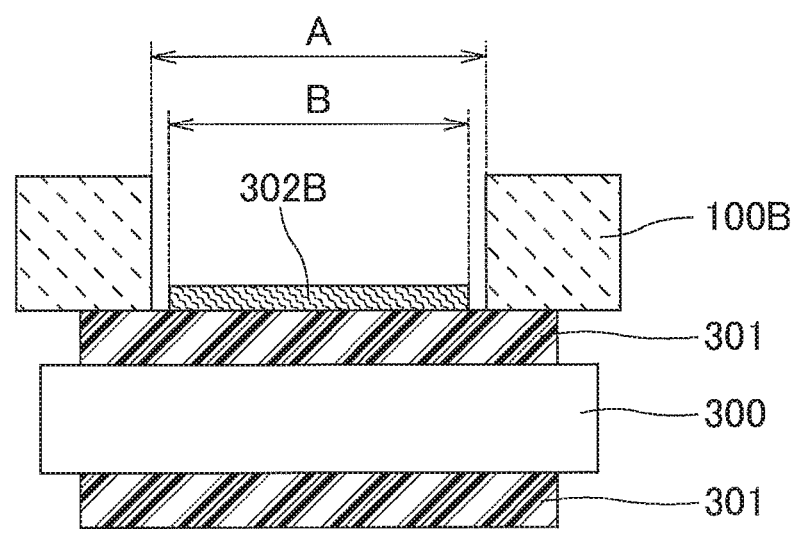
FIG. 33 is a schematic cross-sectional view illustrating the structure of a liquid crystal display device in Embodiment 4.

FIG. 33 is a schematic cross-sectional view illustrating the structure of a liquid crystal display device in Embodiment 4. In the structure of FIG. 33, there is an uneven portion having a height of 0.1 to 20 mm, for example, between the top of the protrusion of the frame portion 100B and the surface of the liquid crystal panel 300. When the width of the opening of the frame portion 100B is defined as A and the width of the optical film 302B arranged within the opening is defined as B, an optical film 302B is arranged on the outermost surface of the liquid crystal panel 300 to satisfy the relation of A-B>0. With such a structure, the optical film 302B can be changed to a new one without removing the outer frame 100B. As a result, the optical film 302B attached to the surface of the liquid crystal panel 300 can be easily changed when damaged, or the optical film 302B attached to the surface of the liquid crystal panel 300 can be easily changed to the most advanced optical film as needed. The optical film to be changed is particularly preferably one that can control the surface properties. For example, change of films can be facilitated for optical films such as low reflection films (e.g. films with a moth-eye structure, AR films, LR films), anti-glare (AG) films, polarizers, circular polarizers, anti-fouling films, hard coat (HC) films, and SAM films. Although a liquid crystal display device is described as an example of the display device of Embodiment 4, the display device may be a flat display panel (FDP) such as an organic light-emitting diode (OLED) display device and a display device with a micro electromechanical system (MEMS) shutter system, or may be a display device with a touch panel. In particular, in the case of a display device that causes a large internal reflection and is vulnerable to external light, the internal reflection can be effectively suppressed by use of a $\lambda/4$ plate and a polarizer in combination.

Embodiment 5

In Embodiment 5, the film attachment method in the case where the attachment surface of the substrate is a curved surface is described. For film attachment, a weak adhesive layer made of a silicon-based weak adhesive material is commonly used. Although such a silicon-based weak adhesive layer has weak adhesive power, the film is brought into close contact when the air is pushed out from the interface. The silicon-based weak adhesive layer is thus suitable for attachment to a flat glass plate, but in the case of a curved attachment surface, the film tends to peel off from an end due to its elastic modulus. Also in the case where the film is attached to the surface of a polymer (resin material) or the surface of a film with irregularities (e.g. AG film), the film tends to peel off. In the case of a resin material, especially on a hydrophobic surface with many weak C—H bonds, the contact power of the adhesive material decreases. Since weak adhesive materials are designed to have low contact power, a slight decrease in the contact power leads to peeling. On the irregular surface, a weak adhesive material having a small deformation amount cannot fit the irregularities, which is likely to allow entry of air bubbles, causing peeling from the peripheries where stress is easily applied.

Such peeling can be suppressed by use of a strong adhesive layer. A strong adhesive layer, however, involves difficulties in reattachment, and therefore foreign substances entered during attachment cannot be removed. In particular, attachment failure on a mobile device brings difficulties in repairing due to the thin glass substrate. With the laminated film of the present invention, a strong adhesive layer can be used to attach a functional film while entry of foreign substances is prevented. The laminated film of the present invention thus enables attachment to a curved surface.

Figure 34:
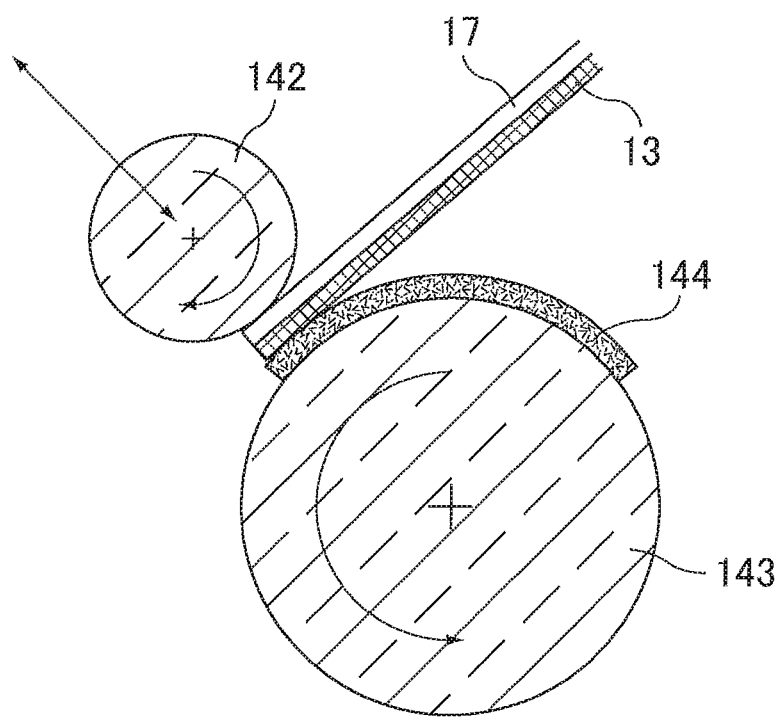
FIG. 34 is a schematic side view for describing the structure of an attachment jig for a curved substrate.

The laminated film of the present invention enables attachment to a curved surface. The process of attaching the laminated film of the present invention to a curved surface is basically the same as that in Embodiment 1, but the attachment jig illustrated in FIG. 34 is suitably used. FIG. 34 is a schematic side view for describing the structure of an attachment jig for a curved substrate. As illustrated in FIG. 34, the attachment jig has a structure in which a curved-surface attachment roller 142 and a cylindrical supporting drum 143 face each other. The curved-surface attachment roller 142 is connected to an elastic body such as a spring or to a piston, and is driven in the up-down directions (the directions of the arrow in FIG. 34) under a certain pressure. On the supporting drum 143, a curved substrate 144 such as a curved display to which a film is to be attached is arranged. The supporting drum 143 is selected to suit the curvature of the curved substrate 144. Here, an adjustment jig may be used, so that the difference in the curvatures of the drum and the substrate can be eliminated. The film is attached by passing the laminated film including the foreign-substance-removing film 13 and the optical film 17 between the curved-surface attachment roller 142 and the supporting drum 143 in the state where the curved substrate 144 is arranged on the supporting drum 143.

Here, in the case of using an attachment jig illustrated in FIG. 34, the curvature of each of the supporting drum 143 and the curved substrate 144 is preferably 30 mmϕ or more. A curvature of less than 30 mmϕ may cause the attached film to be peeled off. For example, when a strong adhesive (LINTEC Corporation, MO3014) was attached to a triacetyl cellulose (TAC) layer with a curvature of less than 30 mmϕ and a thickness of 80 μm, storage of the resulting product at 40° C. for 24 hours resulted in peeling of an end of the optical film 17.

Example 1

Figure 35:
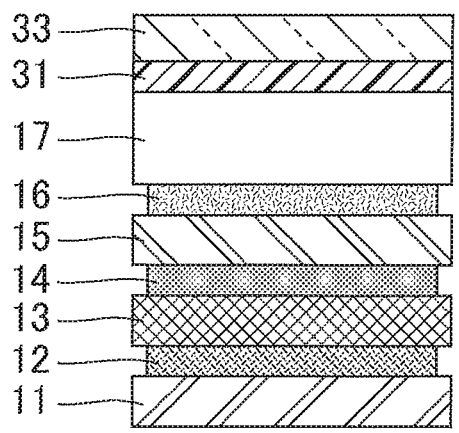
FIG. 35 is a schematic view illustrating a cross section of a laminated film of Example 1.
Figure 36:
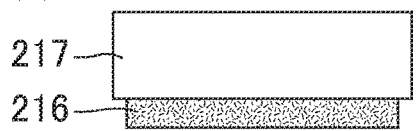
FIG. 36 includes schematic cross-sectional views illustrating a conventional method for attaching a laminated film.
Figure 36:
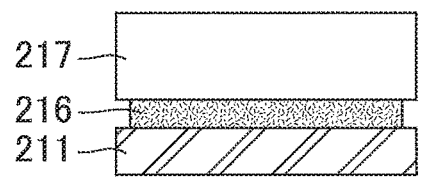
Figure 36:
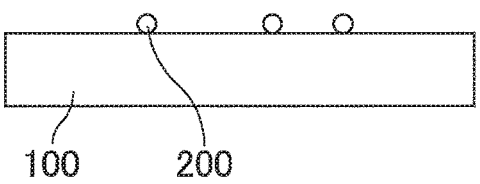
Figure 36:
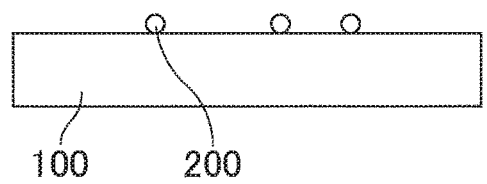
Figure 36:
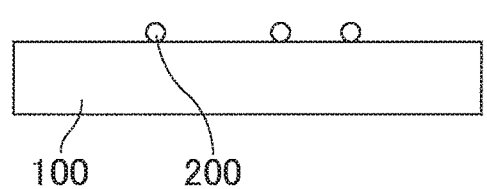
Figure 36:
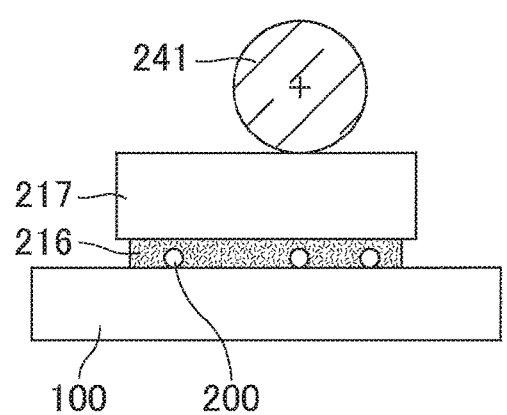

Example 1 shows the case where a laminated film of Embodiment 1 was actually produced. FIG. 35 is a schematic view illustrating the cross section of the laminated film of Example 1. The laminated film of Example 1 has the structure illustrated in FIG. 35, and the materials and the thicknesses of the respective layers are as listed below.

First separator film 11: PET film, 38 μm in thickness
Foreign-substance-removing adhesive layer 12: Fujimori Kogyo Co., Ltd., (trade name) TFB-4T3-367AS, 25 μm in thickness
Foreign-substance-removing film 13: PET film, 38 μm in thickness
Integrating adhesive layer 14: Fujimori Kogyo Co., Ltd., (trade name) ZBO-0421, 21 μm in thickness
Second separator film 15: PET film, 38 μm in thickness
Substrate-attaching adhesive layer 16: LINTEC Corp., (trade name) MO3014, 50 μm in thickness
Optical film 17: moth-eye film, 70 μm in thickness
Adhesive layer 31: moth-eye film adhesive agent (LINTEC Corp.), 25 μm in thickness
Protective film 33: PET film, 100 μm in thickness The first separator film 11, the foreign-substance-removing film 13, the second separator film 15, and the protective film 33 were each a PET film. A PET film has an excellent mechanical strength and is industrially mass-produced even though it is inferior to a PEN film and a COP film in terms of the optical properties. Hence, a PET film is particularly suited for a film which is not required to have high optical properties.

(PET Film Properties)
Tensile strength: 200 to 290 MPs
Transmittance: 89%
Haze: 2 to 3%
(PEN Film Properties)
Tensile strength: 200 to 290 MPs
Transmittance: 89%
Haze: 2 to 3%
(COP Film Properties)
Tensile strength: 60 to 80 MPs
Transmittance: 92%
Haze: 0.1% or lower A moth-eye film is a laminated body including an upper layer made of an acrylate-based photocurable resin and a lower layer made of triacetyl cellulose (TAC). On the surface of the upper layer, 200 nm height protrusions are formed with an interval of 200 nm to form a moth-eye surface structure. The material of the optical element film is selected to suit the use, and a TAC film having a high transmittance (92%) is suitable. In order to increase the moisture resistance and heat resistance, a film such as a COP film may also be used.

The adhesive power of each layer in the laminated film of Example 1 was as described below. The adhesive power was measured by the following method using a substrate made of alkali-free glass as an attachment target. Here, an easy-peel treatment was performed on the substrate-attaching adhesive layer 16 side surface of the second separator film 15, and thus the adhesive power of the substrate-attaching adhesive layer 16 was measured using an alkali-free glass substrate on which the same easy-peel treatment was performed. In the following, the unit of the adhesive power is N/25 mm width. The measurement was performed on multiple samples, and thus the adhesive power is shown as a value in a range.

Foreign-substance-removing adhesive layer 12 (interface with first separator film 11): 0.15 to 0.25

Integrating adhesive layer 14 (interface with foreign-substance-removing film 13): 0.3 to 0.4

Substrate-attaching adhesive layer 16 (interface with second separator film 15): 1 to 2

Adhesive layer 31 (interface with optical film 17): 0.1 to 0.2

(Method for Measuring Adhesive Power)

On the substrate horizontally fixed, a strip-like film including an adhesive layer with a width of 25 mm was attached. At this time, one end of the film was not attached to the substrate. The one end not attached to the substrate was held between clamps of a tensile tester (peel test jig), so that a 90° peel test (rate of pulling: 0.3 m/min) was performed.

The laminated film of Example 1 is peeled off from the lowest film. Hence, the adhesive power values of the films preferably satisfy the relation of the foreign-substance-removing adhesive layer 12<the integrating adhesive layer 14<the substrate-attaching adhesive layer 16, in consideration of the process. Also, since the workability decreases when the adhesive power of the foreign-substance-removing adhesive layer 12 is excessively high, the foreign-substance-removing adhesive layer 12 is preferably an easy-peel adhesive layer made of a resin which has no adhesive power and of which the reaction has been fully completed.

Since the easy-peel treatment was performed on the upper surface of the second separator film 15, the substrate-attaching adhesive layer 16 exhibited a higher bond strength with the optical film 17 than with the second separator film 15.

The bond strength between the optical film 17 and the protective film 33 depends on the optical film 17. For example, a film having a moth-eye structure with irregularities formed at a pitch of 100 to 200 nm exhibits very low bond strength. Still, since the attachment method described in Embodiment 2 fixes the optical film 17 with a pin or adhesive material, no force is applied to the protective film 33. Hence, the protective film 33 can be sufficiently prevented from being peeled off during the attachment work.

In the above embodiments and example, examples of optical films were described as the functional films, but in the present invention, the kind of the functional film is not particularly limited. Examples of the functional film include optical films and protective films each designed to be attached to the surface of a display device such as a mobile device, and protective films and decorative films used for applications such as building materials and display cases.

Suitable examples of the optical film in the present invention include the following films (1) to (7), and combinations of at least two of the following films (1) to (7). The concept of the present invention is preferably applied to a functional film that is expensive and exhibits poor yield.

(1) Anti-Reflection Film

Examples of the anti-reflection film include films having a moth-eye structure, and films formed by laminating low-refractive thin-films. A film having a moth-eye structure includes protrusions arranged at a pitch and a height of 100 nm to hundreds of nm, and exhibits a function of preventing interface reflection by continuously changing the refractive index in the interface with the air layer.

(2) Circular Polarizer

A circular polarizer arranged on the surface of a liquid crystal panel can prevent light, which entered the liquid crystal panel from the outside and then reflected in the inside of the liquid crystal panel, from being emitted to the outside. That is, reflection of the external light on the display screen can be prevented. This is because the polarization state of the polarized light reflected inside the liquid crystal panel is 90° circulated by a change in the phase difference of $\lambda/2$, and is blocked by the circular polarizer. A combination of the circular polarizer with the anti-reflection film (1) can suppress both the surface reflection and the internal reflection, and is effective in improving the display qualities.

(3) Film Improving Antifouling Property and Abrasion-Resistance

Examples of the film include those on which a water/oil repellent film is formed. Examples of the water/oil repellent film include films obtained by applying a solubilized fluoropolymer and drying the fluoropolymer; films of a siloxane-based material obtained by chemically bonding molecules with fluorine-based side chains to the surface of a substrate by reactive groups; and films having a low surface tension obtained by polymerizing fluorine-based monomers and oligomers. Examples of the commercially available products thereof include CYTOP (from Asahi Glass Co., Ltd.) which is a soluble fluoropolymer, and Fluoro Surf (from Fluoro-Technology Co., LTD.) which is a fluoro compound mold release agent.

(4) SAM Film

This is a wide-viewing-angle film that diffuses straight-advancing light to all directions by the fine wedge-shaped slope structure.

(5) Film Touch Panel

The processing yield of the film can be improved by attaching the film in the rolled state, and cutting the film after application of an adhesive agent. This is because an increase in the thickness of the film at the time of attachment leads to an appropriate strength. In particular, when the film is attached to a large-sized display device such as one for signage, the effect of improving the yield is large.

(6) Film for which Cleanroom Cannot be Used

Optical films for building materials (e.g. shatterproof films, heat-ray cutting films, anti-fouling films, anti-glare (AG) films, damage resistant films, anti-fogging films) are usually washed with water and attached with water, but entry of foreign substances is not avoidable, and use of water requires additional work for covering at site. The film structure and the film attachment method of the present invention eliminate use of water, and can sufficiently prevent entry of foreign substances even outside a cleanroom.

(7) Glass Thin Plate (Especially Front Plate)

The processing yield of the film can be improved by attaching the film in the rolled state, and cutting the film after application of an adhesive agent. This is because an increase in the thickness of the film at the time of attachment leads to an appropriate strength, which reduces the risk of breaking.

[Remarks]

Hereinafter, preferred examples of the laminated film of the present invention are described. These examples may be appropriately combined as long as the combination does not go beyond the spirit of the present invention.

Preferably, in the interface with the substrate-attaching adhesive layer, the second surface protective film is surface-treated for a decrease in the adhesive power. Examples of the surface treatment include coating.

At least one of the foreign-substance-removing film and the second surface protective film is preferably colored. Both of the foreign-substance-removing film and the second surface protective film are more preferably colored. The foreign-substance-removing film and the second surface protective film are still more preferably in different colors from each other.

Preferably, at least one of the foreign-substance-removing film and the second surface protective film includes a body and an extension portion for pulling, the extension portion for pulling being provided with an opening. More preferably, each of the foreign-substance-removing film and the second surface protective film includes a body and an extension portion for pulling, the extension portion for pulling being provided with an opening. The opening of at least one of the foreign-substance-removing film and the second surface protective film may be an opening (i.e., slit) into which the other of the films is inserted to integrate the films, or may be a hole in which a hook of a pick-up stick is put.

The functional film is preferably an optical film. Examples of the optical film include films having a moth-eye structure.

The functional film is preferably a protective film. The functional film may function both as an optical film and a protective film.

The laminated film may further include a buffer layer on the side of the functional film opposite to the side where the functional film is in contact with the substrate-attaching adhesive layer.

Hereinafter, preferred examples of the film attachment method of the present invention are described. These examples may be appropriately combined as long as the combination does not go beyond the spirit of the present invention.

In the step (5), preferably, the foreign-substance-removing adhesive layer and the second surface protective film are peeled off by winding each of the foreign-substance-removing film and the second surface protective film on a winding roller, and the substrate-attaching adhesive layer is brought into close contact with the substrate by pressing the substrate-attaching adhesive layer onto the substrate with an attachment roller.

Preferably, a winding speed (peeling speed) for the foreign-substance-removing film and a winding speed for the second surface protective film each are equal to or faster than an attachment speed for the functional film.

The foreign-substance-removing film and the second surface protective film are preferably pulled in the same direction at the same speed.

The foreign-substance-removing film and the second surface protective film are preferably integrated when peeled off.

The foreign-substance-removing film and the second surface protective film are preferably integrated by inserting one of the films into a slit formed in the other of the films.

The foreign-substance-removing film and the second surface protective film are preferably integrated by attaching the films to each other with an adhesive layer in between.

The foreign-substance-removing film and the second surface protective film are preferably integrated by putting a hook of a pick-up stick in openings of the respective films formed at the respective corresponding positions.

In the step (5), preferably, a pick-up stick including an adhesive member at an end is used. Also preferably, a pick-up stick including a hook at an end is used.

The substrate may have a curved surface, and in the step (2), the laminated film may be attached to the substrate by arranging the substrate on a supporting drum having a cylindrical shape, and passing the laminated film between the supporting drum and an attachment roller arranged to face the supporting drum.

Another aspect of the present invention may be a display device including: a display panel provided with an image display region; an optical film arranged on the outermost surface of the display panel; and an outer frame including a portion protruding more than the outermost surface of the display panel, the optical film covering the image display region, the outer frame including an opening that exposes the entire region in which the optical film is arranged.

REFERENCE SIGNS LIST 10, 10a, 21, 22: Laminated film
11: First separator film
12: Foreign-substance-removing adhesive layer
13: Foreign-substance-removing film
14: Integrating adhesive layer
15: Second separator film
16: Substrate-attaching adhesive layer
17: Optical film
18: First intermediate
19: Second intermediate
26, 28: Adhesive layer
27: Cushion layer (buffer layer)
29: Separator film
30: Tape
31: Adhesive layer
32: Third separator film
33: Protective film
41, 141, 241: Attachment roller
60: Attachment lead film
61: First pull portion
63: Extension portion
71, 72, 74, 75, 76, 81, 82, 84, 85, 86, 94, 95, 96: Roller
73, 83, 93: Adhesive material-supplying device
100: Substrate
100A: Display portion
100B: Frame portion (outer frame)
102: Fixing base
102a: Positioning pin
110, 170: Attachment portion
111, 131, 151, 171: First pull portion
112, 132, 152, 172: Second pull portion
113, 133, 153, 173: Extension portion
116, 117, 118, 136, 137, 138, 156, 157, 158, 176, 177, 178: Slit 119, 138a, 139, 158a, 159, 179: Opening
142: Curved-surface attachment roller
143: Supporting drum
144: Curved substrate
191: Pick-up stick
191a: Hook
192: Double-sided tape
200: Foreign substance
211: Separator film
216: Adhesive layer
217: Optical film
300: Liquid crystal panel
301: Polarizer
302A, 302B: Optical film

The invention claimed is:

1. A laminated film comprising in the following order:
a first separator film;
a foreign-substance-removing adhesive layer;
a foreign-substance-removing film;
an integrating adhesive layer;
a second separator film;
a substrate-attaching adhesive layer; and
a functional film,
a buffer layer,
wherein
the substrate-attaching adhesive layer exhibits a relatively higher bond strength with the functional film than with the second separator film,
each of the foreign-substance-removing film and the second separator film includes an extension portion for pulling,
the extension portion for pulling of the foreign-substance-removing film is provided with a first opening portion,
the extension portion for pulling of the second separator film is provided with a second opening portion, arranged to be overlapped with the first opening portion, and
the buffer layer is flexible and includes a hardness enabling the buffer layer to maintain a shape of the buffer layer upon being peeled off.

2. The laminated film according to claim 1, wherein in the interface with the substrate-attaching adhesive layer, the second separator-film is surface-treated for a decrease in the adhesive power.

3. The laminated film according to claim 1, wherein at least one of the foreign-substance-removing film and the second separator film is colored.

4. The laminated film according to claim 1, wherein the functional film is an optical film.

5. The laminated film according to claim 1, wherein the functional film is a protective film.

6. The laminated film according to claim 1, wherein the buffer layer is composed of an elastic body.

7. The laminated film according to claim 1, wherein the buffer layer is composed of a foamed body of a resin material.

8. A film attachment method for attaching to a substrate a functional film included in the laminated film according to claim 1, comprising the steps of:
(1) peeling off the first separator film from the laminated film to expose the foreign-substance-removing adhesive layer;
(2) bringing the exposed foreign-substance-removing adhesive layer into close contact with the surface of the substrate to attach the laminated film to the substrate;
(3) connecting, by a connection component, a vicinity of the region of the substrate with the laminated film attached thereto and an end of the functional film that is on the top of the laminated film;
(4) peeling off the integrating adhesive layer from the foreign-substance-removing film in the state where the substrate and the functional film are kept in contact with each other by the connection component; and
(5) peeling off the second separator film from the substrate-attaching adhesive layer to expose the substrate-attaching adhesive layer while peeling off the foreign-substance-removing adhesive layer from the surface of the substrate to expose the surface of the substrate and, immediately after the exposure, bringing the exposed substrate-attaching adhesive layer into close contact with the exposed surface of the substrate to attach the functional film to the substrate.

9. The film attachment method according to claim 8, wherein in the step (5), the foreign-substance-removing adhesive layer and the second separator film are peeled off by winding each of the foreign-substance-removing film and the second separator film on a winding roller, and the substrate-attaching adhesive layer is brought into close contact with the substrate by pressing the substrate-attaching adhesive layer onto the substrate with an attachment roller.

10. The film attachment method according to claim 9, wherein a winding speed for the foreign-substance-removing film and a winding speed for the second separator film each are equal to or faster than an attachment speed for the functional film.

11. The film attachment method according to claim 9, wherein the foreign-substance-removing film and the second separator film are pulled in the same direction at the same speed.

12. The film attachment method according to claim 11, wherein the foreign-substance-removing film and the second separator film are integrated when peeled off.

13. The film attachment method according to claim 12, wherein the foreign-substance-removing film and the second separator film are integrated by inserting one of the films into the first opening portion or the second opening portion formed in the other of the films.

14. The film attachment method according to claim 12, wherein the foreign-substance-removing film and the second separator film are integrated by putting a hook of a pick-up stick in the first opening portion and the second opening portion.

15. The film attachment method according to claim 8, wherein in the step (5), a pick-up stick including an adhesive member at an end is used.

16. The film attachment method according to claim 8, wherein in the step (5), a pick-up stick including a hook at an end is used.

17. The film attachment method according to claim 8, wherein the substrate has a curved surface, and
in the step (2), the laminated film is attached to the substrate by arranging the substrate on a supporting drum having a cylindrical shape, and passing the laminated film between the supporting drum and an attachment roller arranged to face the supporting drum.

18. A laminated film comprising in the following order:
a first separator film;
a foreign-substance-removing adhesive layer;
a foreign-substance-removing film;
an integrating adhesive layer;
a second separator film;

a substrate-attaching adhesive layer;
a functional film, and
a buffer layer,
wherein
the substrate-attaching adhesive layer has higher adhesive power than the foreign-substance-removing adhesive layer and the integrating adhesive layer,
each of the foreign-substance-removing film and the second separator film includes an extension portion for pulling,
the extension portion for pulling of the foreign-substance-removing film is provided with a first opening portion,
the extension portion for pulling of the second separator film is provided with a second opening portion, arranged to be overlapped with the first opening portion, and
the buffer layer is flexible and includes a hardness enabling the buffer layer to maintain a shape of the buffer layer upon being peeled off.

19. The laminated film according to claim 18, wherein an adhesive power of the substrate-attaching adhesive layer is 1 to 30 N/25 mm width.

20. The laminated film according to claim 18, wherein an adhesive power of the foreign-substance-removing adhesive layer is 0.05 to 1 N/25 mm width.

21. The laminated film according to claim 18, wherein an adhesive power of the integrating adhesive layer is 0.05 to 1 N/25 mm width.

22. The laminated film according to claim 18, wherein the buffer layer is composed of an elastic body.

23. The laminated film according to claim 18, wherein the buffer layer is composed of a foamed body of a resin.

* * * * *